United States Patent
Wei et al.

(10) Patent No.: US 10,871,953 B2
(45) Date of Patent: Dec. 22, 2020

(54) APPLICATION UPDATE METHOD AND APPARATUS

(71) Applicant: Tencent Technology (Shenzhen) Company Limited, Shenzhen (CN)

(72) Inventors: Yufeng Wei, Shenzhen (CN); Linghe Rao, Shenzhen (CN); Jintao Li, Shenzhen (CN); Mengguang Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/046,735

(22) Filed: Jul. 26, 2018

(65) Prior Publication Data

US 2018/0373523 A1 Dec. 27, 2018

Related U.S. Application Data

(63) Continuation-in-part of application No. PCT/CN2017/072269, filed on Jan. 23, 2017.

(30) Foreign Application Priority Data

May 7, 2016 (CN) .......................... 2016 1 0297069

(51) Int. Cl.
*G06F 8/65* (2018.01)
*G06F 21/57* (2013.01)
(Continued)

(52) U.S. Cl.
CPC ................. *G06F 8/65* (2013.01); *G06F 8/71* (2013.01); *G06F 9/445* (2013.01); *G06F 9/48* (2013.01);
(Continued)

(58) Field of Classification Search
CPC ... G06F 8/65; G06F 8/71; G06F 9/445; G06F 9/48; G06F 21/51; G06F 21/57; H04L 67/34
(Continued)

(56) References Cited

U.S. PATENT DOCUMENTS

| 8,230,415 B1 * | 7/2012 | Thomas | ................... G06F 21/57 717/168 |
| 9,043,778 B2 * | 5/2015 | Lin | ........................... G06F 8/65 717/170 |

(Continued)

FOREIGN PATENT DOCUMENTS

| CN | 1399737 A | 2/2003 |
| CN | 103428188 A | 12/2013 |

(Continued)

OTHER PUBLICATIONS

CN105320554A, English Translation, Lin et al, "Program update method, and system for the client program update", [Online], Feb. 10, 2016, pp. 1-11, [Retrieved from internet on Aug. 26, 2019], <https://patents.google.com/patent/CN105320554A/en?oq=105320554> (Year: 2016).*

(Continued)

*Primary Examiner* — Geoffrey R St. Leger
*Assistant Examiner* — Zengpu Wei
(74) *Attorney, Agent, or Firm* — Morgan, Lewis & Bockius LLP

(57) ABSTRACT

When an application client is started, if an application patch file package exists for the application client, the device invokes a DexClassLoader to load one or more executable files generated from one or more class files for which an updated version and a current version of the application client have a difference. The device initializes the application client by inserting each of the one or more executable (Continued)

files in front of existing executable files of a corresponding application component in the current version of the application client, such that invocation of corresponding class files for the one or more classes in the current version of the application client is bypassed during the initializing of the application client. The present disclosure resolves a technical problem that when an application is updated, a current operation needs to be interrupted to enter an installation interface, consequently reducing application update efficiency.

20 Claims, 13 Drawing Sheets

(51) Int. Cl.
    *G06F 9/445*   (2018.01)
    *G06F 8/71*    (2018.01)
    *G06F 9/48*    (2006.01)
    *G06F 21/51*   (2013.01)
    *H04L 29/08*   (2006.01)

(52) U.S. Cl.
    CPC .............. *G06F 21/51* (2013.01); *G06F 21/57* (2013.01); *H04L 67/34* (2013.01)

(58) Field of Classification Search
    USPC ......................................................... 717/178
    See application file for complete search history.

(56) References Cited

U.S. PATENT DOCUMENTS

| | | | | |
|---|---|---|---|---|
| 2005/0102660 | A1* | 5/2005 | Chen | G06F 8/65 717/168 |
| 2011/0321024 | A1* | 12/2011 | Knothe | G06F 8/656 717/168 |
| 2013/0198730 | A1* | 8/2013 | Munireddy | G06F 8/654 717/170 |
| 2013/0311599 | A1 | 11/2013 | Aleksandrov et al. | |
| 2014/0156805 | A1* | 6/2014 | Gomes | H04L 67/06 709/219 |
| 2014/0304697 | A1* | 10/2014 | Lin | G06F 8/65 717/170 |
| 2015/0128121 | A1* | 5/2015 | Garcia | G06F 8/65 717/170 |
| 2015/0268946 | A1* | 9/2015 | Groover | G06F 8/65 717/168 |

FOREIGN PATENT DOCUMENTS

| | | | | |
|---|---|---|---|---|
| CN | 103442026 | A | | 12/2013 |
| CN | 103701930 | A | | 4/2014 |
| CN | 104077162 | A | | 10/2014 |
| CN | 103677877 | A | * 12/2014 | ............ G06F 9/445 |
| CN | 104252364 | A | | 12/2014 |
| CN | 105320554 | A | * 12/2015 | ............ G06F 9/445 |
| CN | 105320554 | A | | 2/2016 |

OTHER PUBLICATIONS

CN103677877A, English Translation, Li et al, "Method and device for updating local advertisement software development kit", [Online], Mar. 26, 2014, pp. 1-17, [Retrieved fron internet on Aug. 26, 2019], <https://patents.google.com/patent/CN103677877A/en?q=software&q=update&q=dexclassloader&scholar&oq> (Year: 2014).*

Bhattacharya et al, "Dynamic Updates for Web and Cloud Applications", [Online], 2010, pp. 21-25, [Retrieved from internet on Sep. 30, 2020], <https://dl.acm.org/doi/pdf/10.1145/1810139.1810143> (Year: 2010).*

Stoyle et al , "Safe and Predictable Dynamic Software Updating", [Online], 2005, pp. 183-194, [Retrieved from internet on Sep. 30, 2020], <https://dl.acm.org/doi/pdf/10.1145/1047659.1040321> (Year: 2005).*

Xiao et al , "Towards Dynamic Component Updating: A Flexible and Lightweight Approach", [Online], 2009, pp. 468-473, [Retrieved from internet on Sep. 30, 2020], <https://ieeexplore.ieee.org/stamp/stamp.jsp?tp=&arnumber=5254224> (Year: 2009).*

Tencent Technology, ISRWO, PCT/CN2017/072269, Apr. 20, 2017, 6 pgs.

Tencent Technology, IPRP, PCT/CN2017/072269, Nov. 13, 2018, 5 pgs.

* cited by examiner

APPLICATION UPDATE METHOD AND APPARATUS

PRIORITY CLAIMS AND RELATED APPLICATIONS

This application is a continuation-in-part application of PCT application number PCT/CN2017/072269, entitled "APPLICATION UPDATE METHOD AND APPARATUS", filed with the Chinese Patent Office on Jan. 23, 2017, which claims priority to Chinese Patent Application No. 201610297069.4, entitled "APPLICATION UPDATE METHOD AND APPARATUS" filed with the Patent Office of China on May 7, 2016, all of which are incorporated by reference in their entirety.

FIELD OF THE TECHNOLOGY

The present disclosure relates to the field of computers, and in particular, to an application update method and apparatus.

BACKGROUND OF THE DISCLOSURE

Currently, with increasing of user needs, an application version needs to be updated according to the user needs. In the existing technology, application version update usually includes the following two manners:

An integrated update manner is to download a new-version integrated package by using an application market or a self-update function built in the application.

An increment update manner is to collect package information of an application of a client needing to be updated in the application market, perform difference comparison at a server end of the application market, provide an increment package to the client to download, and mix the increment package and a local old-version package on the client into a new-version package to install.

SUMMARY

The foregoing two application update manners both need the new-version package to cover the old-version package, so as to reach a purpose of updating a version. However, the foregoing two application update manners have the following disadvantages:

The integrated update manner needs to re-download the integrated package, which consumes a relatively long downloading time and traffic for a large-volume package. In addition, when the application is updated, a current operation of a user needs to be interrupted, reducing application update efficiency, largely affecting user experience.

The increment update manner can reduce the volume of the package needing to be downloaded by using the difference comparison. However, the increment update manner needs to mix the increment package and the local old-version package on the client, consequently occupying many client resources. A quantity of occupied resources is decided by the size of the local old-version package, the size of the increment package, and performance of the client. In addition, the increment update manner further needs to interrupt the current operation of the user to enter an installation interface to install the application, largely reducing application update efficiency.

Embodiments of the present disclosure provide an application update method and apparatus to at least resolve a technical problem that in related technologies, namely, when an application is updated, a current operation of a user needs to be interrupted to enter an installation interface, consequently reducing application update efficiency.

In one aspect, a method is performed at a computing device having one or more processors and memory. The computing device detects that an application client is started at the computing device. In response to detecting that the application client is started at the computing device, the computing device determines whether an application patch file package exists for the application client at the computing device. In accordance with a determination that the application patch file package exists for the application client at the computing device: the computing device invokes a DexClassLoader to load one or more executable (e.g., Dalvik Executable) files generated from one or more class files for which an updated version and a current version of the application client have a difference. The one or more executable files were generated and included in the application patch file package based on identification of class files in the current version of the application client that have been updated in the updated version of the application client. The computing device initializes the application client by inserting each of the one or more executable files in front of existing executable files of a corresponding application component in the current version of the application client, such that invocation of corresponding class files for the one or more classes in the current version of the application client is bypassed during the initializing of the application client. In accordance with a determination that the application patch file package does not exists for the application client at the computing device, the computing device completes initialization of the application client without updating the current version of the application client.

According to a second aspect of the present disclosure, a server includes one or more processors, memory, and a plurality of instructions stored in the memory that, when executed by the one or more processors, cause the server to perform the aforementioned method.

According to a third aspect of the present disclosure, a non-transitory computer readable storage medium storing a plurality of instructions configured for execution by a server device having one or more processors, the plurality of instructions causing the server device to perform the aforementioned method.

Details of one or more embodiments of the present disclosure are provided in the following accompanying drawings and descriptions. Other features, objectives, and advantages of the present disclosure become clear in the specification, the accompanying drawings, and the claims.

In the embodiments of the present disclosure, when an application client is started, whether a patch file package generated according to class files for which an updated-version and a current-version of the application client have a difference exists is detected, and when it is detected that the patch file package exists, the patch file package is loaded during operation of the application client, so as to implement updating the application client, reaching a purpose of implementing updating the application client without interrupting a current operation of a user, thus implementing a technical effect of improving update efficiency of the application client, so as to resolve a technical problem that in related technologies, when an application is updated, the current operation of the user needs to be interrupted to enter an installation interface, consequently reducing application update efficiency.

BRIEF DESCRIPTION OF THE DRAWINGS

The accompanying drawings described herein are intended to provide further understanding of the present disclosure and are composition part of this application. The exemplary embodiments and description thereof are intended to explain the present disclosure, and not to constitute an improper limitation to the present disclosure. In the accompanying drawings.

DESCRIPTION OF EMBODIMENTS

To make a person skilled in the art understand the solutions in the present disclosure better, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be noted that in the specification, claims, and accompanying drawings of the present disclosure, the terms "first", "second", and so on are intended to distinguish between similar objects rather than describe a specific order or sequence. It should be understood that, data used in this way is exchangeable in a proper case, so that the embodiments described herein of the present disclosure can be implemented in another order except those shown or described herein. Moreover, the terms "include", "contain" and any other variants mean to cover the non-exclusive inclusion, for example, a process, method, system, product, or device that includes a list of steps or units is not necessarily limited to those steps or units expressly listed, but may include other steps or units not expressly listed or inherent to the process, method, product, or device.

A method embodiment of an application update method is provided according to some embodiments of the present disclosure.

Figure 1:
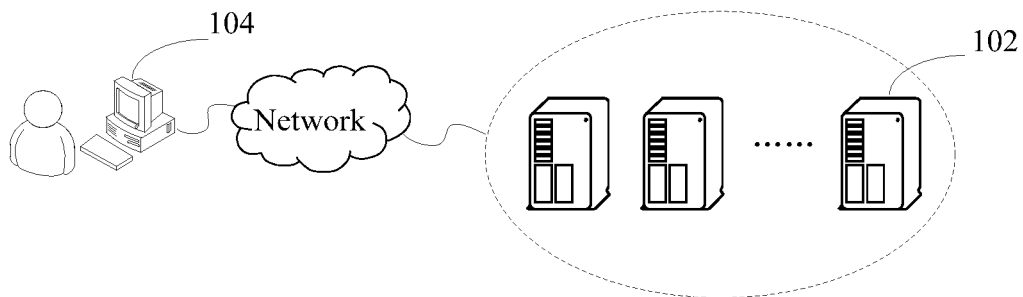
FIG. 1 is a schematic diagram of a hardware environment of an application update method according to some embodiments of the present disclosure.

In some embodiments, the application update method may be applied to a hardware environment composed of a server 102 and a terminal 104 shown in FIG. 1. As shown in FIG. 1, the server 102 is connected to the terminal 104 through a network. The network includes but is not limited to: a wide area network, a metropolitan area network, or a local area network. The terminal 104 is not limited to a personal computer (PC), a smartphone, a tablet computer, and the like. The application update method of some embodiments of the present disclosure may be together performed by the server 102 and the terminal 104.

Figure 2:
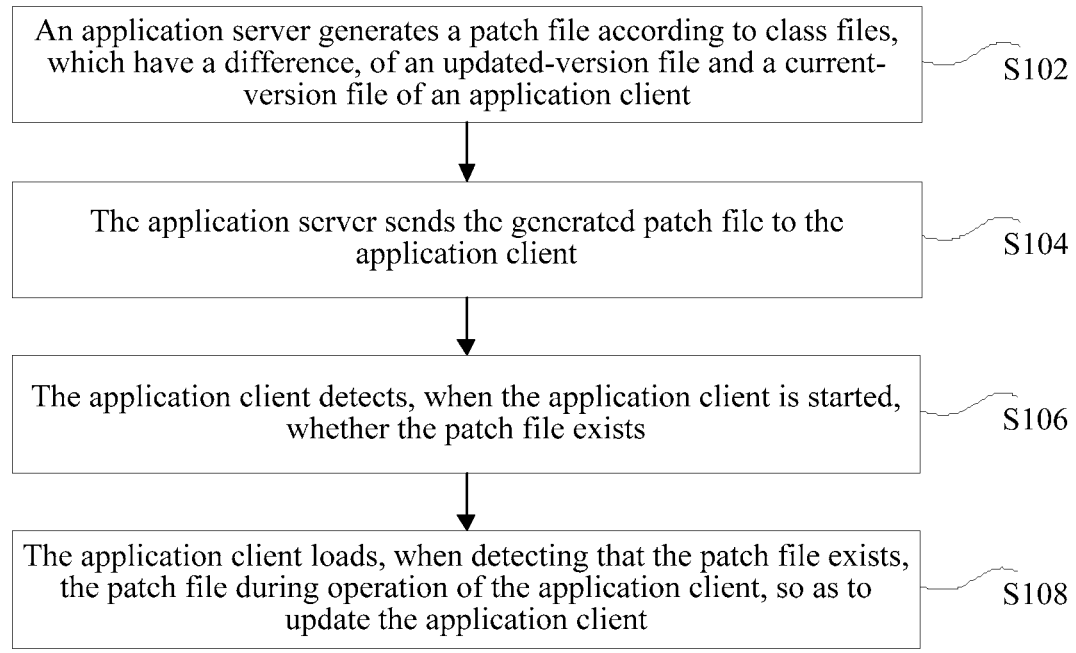
FIG. 2 is a flowchart of an optional application update method according to some embodiments of the present disclosure.

FIG. 2 is a flowchart of an optional application update method according to some embodiments of the present disclosure. As shown in FIG. 2, the method may include the following steps:

Step S102: An application server generates a patch file package according to class files for which an updated-version and a current-version of an application client.

Step S104: The application server sends the generated patch file package to the application client.

Step S106: The application client detects, when the application client is started, whether the patch file package exists.

Step S108: The application client loads, in accordance with a determination that the patch file package exists, the patch file package during operation of the application client, so as to update the application client.

In step S102 to step S108, an application server generates a patch file package according to class files for which an updated-version and a current-version of an application client and sends the patch file package to the application client. The application client detects, when the application client is started, whether the patch file package exists. The application client loads, in accordance with a determination that the patch file package exists, the patch file package during operation of the application client, so as to update the application client. Therefore, a purpose of implementing updating the application client without interrupting a current operation of a user is reached, so as to resolve a technical problem that in related technologies, when an application is updated, the current operation of the user needs to be interrupted to enter an installation interface, consequently reducing application update efficiency, thus implementing a technical effect of improving application update efficiency.

It should be noted that the application server and the application client can compose an application update system. In the system, the application server and the application client communicate with each other, including a wired connection and a wireless connection. The application server can provide data support and maintenance to an application. The application client can be installed on a terminal device having any form. The terminal device may be a smartphone terminal, or may be a computer terminal. Some embodiments of the present disclosure does not specifically limit a type of the application client, for example, an instant messaging application.

In the technical solution provided in step S102, when the updated-version exists in the application client, the application server may generate the patch file package according to the updated-version and the current-version of the application client. In some embodiments, a specific generation process may include the following steps:

Step S1022: The application server obtains the updated-version and the current-version of the application client.

Step S1024: Compare the updated-version and the current-version of the application client, to obtain the class files for which the updated-version and the current-version of the application client have a difference.

Step S1026: Package the class files as the patch file package.

It should be noted that the current-version of the application client may be a version being operated and started by the application client and the updated-version may be an upgraded-version of the current-version operated by the application client. For example, if the current-version started and operated by the application client is V1.0, the updated-version of the application client may be V2.0. It should further be noted that the updated-version may be a version after updating one or more class files in the current-version. Accordingly, one or more different class files may exist between the updated-version and the current-version. In some embodiments of present disclosure, these different class files are packaged as the patch file package and the patch file package is used to update the application client.

Figure 3:
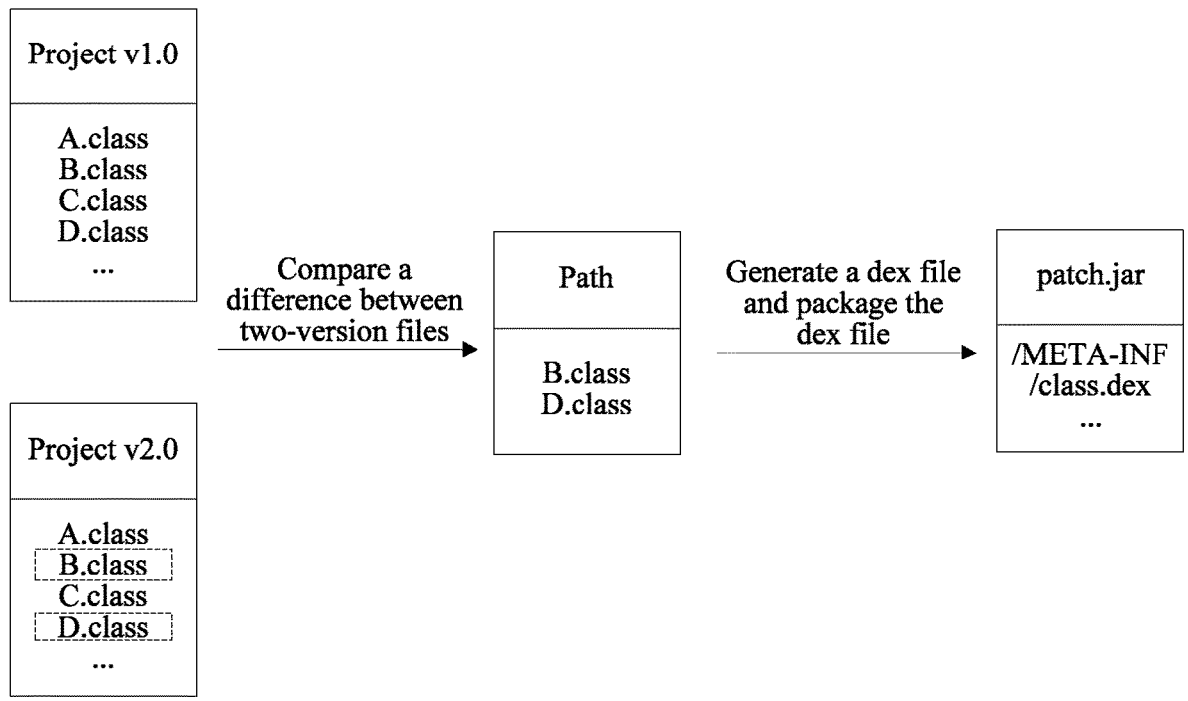
FIG. 3 is a schematic diagram of a generation process of a patch file package according to some embodiments of the present disclosure.

In an actual application scenario, a specific process of generating the patch file package according to the class files for which the updated-version and the current-version of the application client have a difference is shown in FIG. 3. It should be noted that Project v1.0 shown in FIG. 3 is the current-version of the application client, including class files such as A.class, B.class, C.class, and D.class. Project v2.0 is the updated-version of the application client, also including class files such as A.class, B.class, C.class, and D.class. It is assumed that class files of the updated-version Project v2.0 that are revised are B.class and D.class, as shown in a dotted-line block in FIG. 3. the updated-version Project v2.0 and the current-version Project v1.0 of the application client are compared to obtain that class file paths for class files that having a difference between the updated and the current versions, where the class file paths include B.class and/or D.class. Further, each of these class files are independently used to generate a dex file and the dex files are packaged as a patch file package patch.jar.

In the technical solution provided in step S104, the application server sends the generated patch file package to the application client after the application server generates the patch file package, so as to update the application client by using the patch file package when the application client is started. In some embodiments, the application server may further locally buffer the generated patch file package, so as to save a storage space of the application client. When the application client needs to use the patch file package to update, the patch file package can be requested from a buffer of the application server. It should further be noted that the application server can send the generated patch file package to the application client by using a communication connection between the application server and the application client. The communication connection between the application server and the application client may be a wired connection, or may be a wireless connection. When the application server uses the communication connection to send the patch file package to the application client, a real-time sending manner may be used, or a timing sending manner may further be used. Specifically, the real-time sending manner may be sending the generated patch file package to the server at once after the application server generates the patch file package. The timing sending manner may be sending the generated patch file package to the server according to a preset time threshold after the application server generates the patch file package. It should be noted that the preset time threshold in the timing sending manner is very small, so as not to delay application client update. To ensure timeliness of application client update, the application server in some embodiments of the present disclosure preferably uses the real-time sending manner to send the generated patch file package to the server.

In the technical solution provided in step S106, in a process that the application client starts and operates the current-version, whether the patch file package exists can be detected in real time. The patch file package may be a file package generated according to the class files, which have a difference, of the updated-version and the current-version of the application client, so as to update the application client by using the patch file package when it is detected that the patch file package exists. It should be noted that the patch file package detected by the application client may be one or more. The application client may use these patch file packages to update the application client. It should further be noted that when the application client is started, whether the patch file package exists in a local application client can be detected. The local application client may be a memory space or a buffer space of the application client.

In the technical solution provided in step S108, when the application client is started, if the application client detects that one or more patch file packages exist, the application client can load these patch file packages during operation of the application client, so as to implement a purpose of updating the application client. It should be noted that in a process that the application client operates the current-version, the application client loads the patch file package used for updating the application client to implement that in the process that the application client operates the current-version, application client update can be completed, reaching a purpose of implementing updating the application client without interrupting a current operation of a user, so as to resolve a technical problem that in related technologies, when an application is updated, the current operation of the user needs to be interrupted to enter an installation interface, consequently reducing application update efficiency, thus implementing a technical effect of improving application update efficiency.

As an optional embodiment, step S108: The application client loads the patch file package during operation of the application client includes: step S1081: The application client prioritizes the patch file package before a related file in the current-version, so that when a first class file of the patch file package and a second class file of the related file have a same name, the first class file is invoked but the second class file is not invoked.

Figure 4:
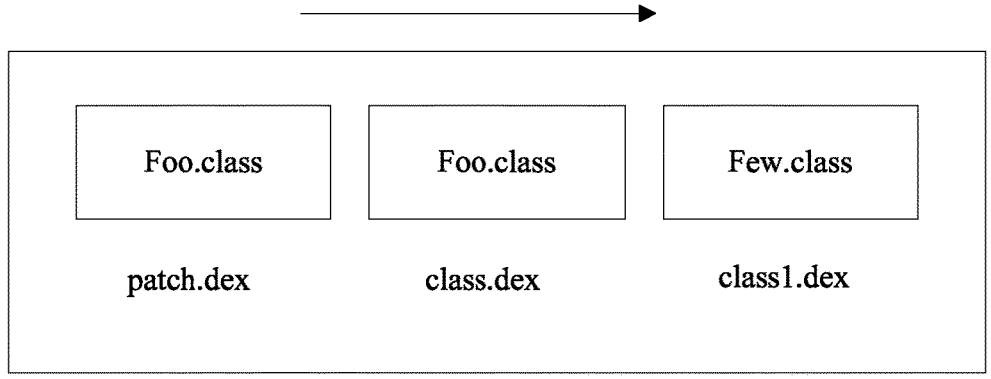
FIG. 4 is a schematic diagram of a loading process of a patch file package according to some embodiments of the present disclosure.

It should be noted that the related file in the current-version of the application client may include but is not limited to the class files needed in an operation process of the application client. A number of the related file may be one or more. In the optional embodiment, the first class file of the patch file package and the second class file of the related file may have a same name. As shown in FIG. 4, a first class file name of a patch file package patch.dex is Foo.class and a second class file name of a related file class.dex is also Foo.class, that is, the first class file of the patch file package patch.dex and the second class file of the related file class.dex have the same name. In this case, the application client can prioritize the patch file package patch-.dex before the related file class.dex in the current-version, as shown in FIG. 4, which starts from left. When the first class file of the patch file package and the second class file of the related file have the same name, the application client prioritizes the patch file package before the related file, so that the first class file of the patch file package is invoked but the second class file of the related file is not invoked during operation of the application client when the application client loads the patch file package. The second class file of the related file may be understood as the class files in the current-version of the application client. The first class file of the patch file package may be understood as the class files that are revised compared with the current-version in the updated-version of the application client. The first class file and the second class file have the same name. The application client invokes the first class file of the patch file package instead of invoking the second class file of the related file, reaching a purpose of updating in a process that the application client operates with the current-version, thus reaching an effect of improving application update efficiency.

In an actual application scenario, when the application client is started, if the application client detects that an effective patch file package exists, the detected patch file package can be loaded in a DexClassLoader manner. One DexClassLoader may include multiple dex files. Each dex file is an Element. Multiple dex files arrange a sequenced array dexElements. The dex files are traversed in sequence to find a class. In different dex files, if the same classes exist, a class of a dex file arranged in the front is preferably selected. Therefore, a class needing to be updated is packaged into a dex (patch.dex as shown in FIG. 4) and the dex is inserted into the foremost of the Elements, thus implementing dynamic update and upgrade of the class.

As an optional embodiment, after step S108, that is, after the application client loads the patch file package during operation of the application client, the optional embodiment may further include: step S1101: The application client invokes the first class file instead of invoking the second class file if the application client detects, when receiving the invoked class files having the same name, that the patch file package is prioritized before the related file and the first class file of the patch file package and the second class file of the related file have the same name.

It should be noted that after the application client loads the patch file package during operation of the application client, the application client can detect whether the application client receives an instruction of the invoked class files having the same name in real time. When receiving the instruction of the invoked class files having the same name, the application client can further detect a location relationship of the class files having the same name. The application client may invoke the first class file instead of invoking the second class file when the application client detects that the patch file package is prioritized (e.g., arranged ordinally) before the related file and the first class file of the patch file package and the second class file of the related file have the same name, as shown in FIG. 4.

The application client of the optional embodiment invokes the first class file instead of invoking the second class file when the application client detects that the patch file package is prioritized before the related file and the first class file of the patch file package and the second class file of the related file have the same name. The second class file of the related file may be understood as the class files in the current-version of the application client. The first class file of the patch file package may be understood as the class files that are revised compared with the current-version in the updated-version of the application client. The first class file and the second class file have the same name. The application client invokes the first class file of the patch file package instead of invoking the second class file of the related file, reaching a purpose of updating in a process that the application client operates with the current-version, so as to resolve a technical problem that in related technologies, when an application is updated, the current operation of the user needs to be interrupted to enter an installation interface, consequently reducing application update efficiency, thus reaching an effect of improving application update efficiency.

As an optional embodiment, when the application client does not detect the patch file package, or after the application client loads the patch file package during operation of the application client, the optional embodiment may further include the following steps:

Step S1102: The application client requests from the application server whether a latest patch file package of the application client exists.

Step S1104: The application client obtains the latest patch file package from the application server if the latest patch file package exists.

Step S1106: The application client loads the latest patch file package after the application client is restarted, so as to update the application client.

It should be noted that when the application client is started, the application client detects whether the patch file package exists, which may be, detects whether the patch file package exists at a local application client. If the patch file package does not exist at the local, the optional embodiment can request from the application server a latest patch file package of the application client. Alternatively, when the application client is started, the application client detects that the patch file package exists at the local, after loading the detected patch file package during operation of the application client, the application client may further request from the application server a latest version of the application client. It should be noted here that the loaded patch file package at the local application client during operation of the application client may not be a latest version, that is, in a process of loading the patch file package the application server may publish an updated-version of the application client to the application client, so that the application client can request from the application server the latest patch file package, so as to reach a purpose of updating the application client. When the latest patch file package exists in the application server, the application client can obtain the latest patch file package from the application server, and load the latest patch file package during operation of the application client after the application client is restarted, so as to update the application client.

The application client of the optional embodiment requests from the application server the latest patch file package, and loads the latest patch file package during operation of the application client, so as to ensure that the application client is updated to the latest version during operation of the application client, thus reaching an effect of improving application update efficiency.

As an optional embodiment, after the application client detects that the patch file package exists and before loading the patch file package during operation of the application client, the optional embodiment may further include: step S1071: The application client performs a security check on the patch file package. Step S108: Load the patch file package during operation of the application client includes: step S1082: The application client loads the patch file package during operation of the application client when the security check succeeds.

It should be noted that after the application client detects that the patch file package exists, the application client may perform the security check on the detected patch file package to ensure that the loaded patch file package during operation of the application client is a safe and reliable file, so as to improve safety and reliability of the application client. It should be noted that specific content of the security check performed by the application client on the patch file package is not specifically limited. The content may include but is not limited to check whether the patch file package includes a suspected virus file, which is not described by examples herein. When the application client detects that the patch file package exists and the security check performed on the patch file package succeeds, the application client can load the patch file package during operation of the application client, so as to implement the purpose of updating the application client.

Figure 5:
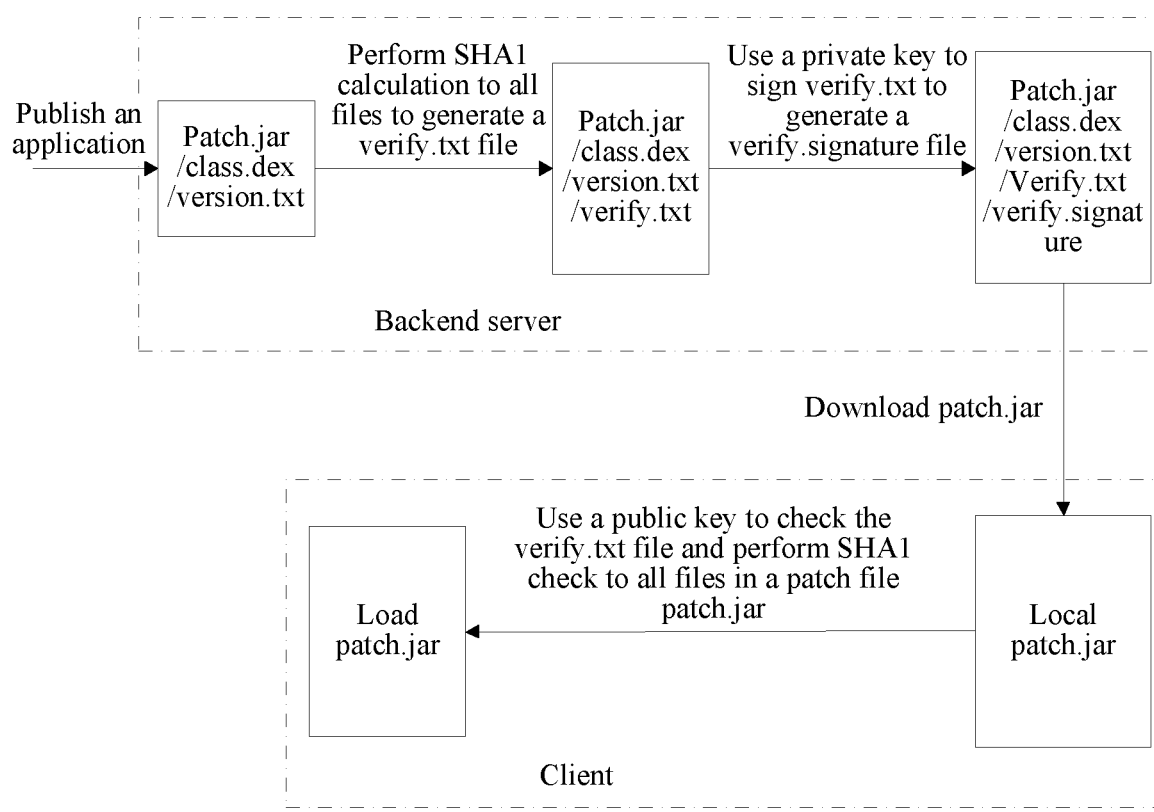
FIG. 5 is a schematic diagram of performing a security check on a patch file package according to some embodiments of the present disclosure.

In an actual application scenario, the patch file package is downloaded and stored at the local client or the server as a form of a jar file, which may be tampered to reach a purpose of damaging the patch file package. Therefore, when the application client detects that the patch file package exists, when downloading is done and during loading, it can be ensured that data in a buffered patch file package is not tampered by using a mechanism of RSA signature and SHA1 check. FIG. 5 is a schematic diagram of performing a security check on a patch file package according to some embodiments of the present disclosure. As shown in FIG. 5, an application server publishes the patch file package and applies to perform the security check on the patch file package. Specifically, first perform SHA1 calculation to all files in a patch file package patch.jar, such as class.dex and version.txt to generate a verify.txt file, and then use a private key to sign verify.txt to generate a verify.signature file. An application client can download the patch file package patch.jar from the application server and store the patch file package patch.jar at a local client. Before loading the patch file package patch.jar, use a public key to check the verify.txt file and perform SHA1 check to all files in the patch file package patch.jar. The application client loads the patch file package patch.jar to update when the check succeeds. It should be noted that SHA1 algorithm is a mature algorithm in the existing technology, which is not specifically limited in some embodiments of the present disclosure and is not described herein.

As an optional embodiment, after the application client detects that the patch file package exists and before loading the patch file package during operation of the application client, the optional embodiment may further include: step S1072: The application client determines whether the patch file package matches the current-version. Step S108: Load the patch file package during operation of the application client includes: step S1083: The application client loads the patch file package when the patch file package matches the current-version.

It should be noted that after the application client detects that the patch file package exists, the application client can determine whether the detected patch file package matches the current-version. It should be noted that the application client does not specifically limit detected content of whether patch file package matches the current-version, which may be, the application client detects whether the patch file package is an updated file of the current-version, which is not described by examples herein. The application client determines whether the patch file package matches the current-version, so as to ensure that the application client can implement accurate update, thus avoiding that the application client is updated to a wrong version. When the patch file package matches the current-version, the application client can load the patch file package, so as to update the application client. After the application client detects that the patch file package exists, the application client determines whether the patch file package matches the current-version, so as to improve accuracy of updating the application client, thus improving performance of the updated application client.

Figure 6:
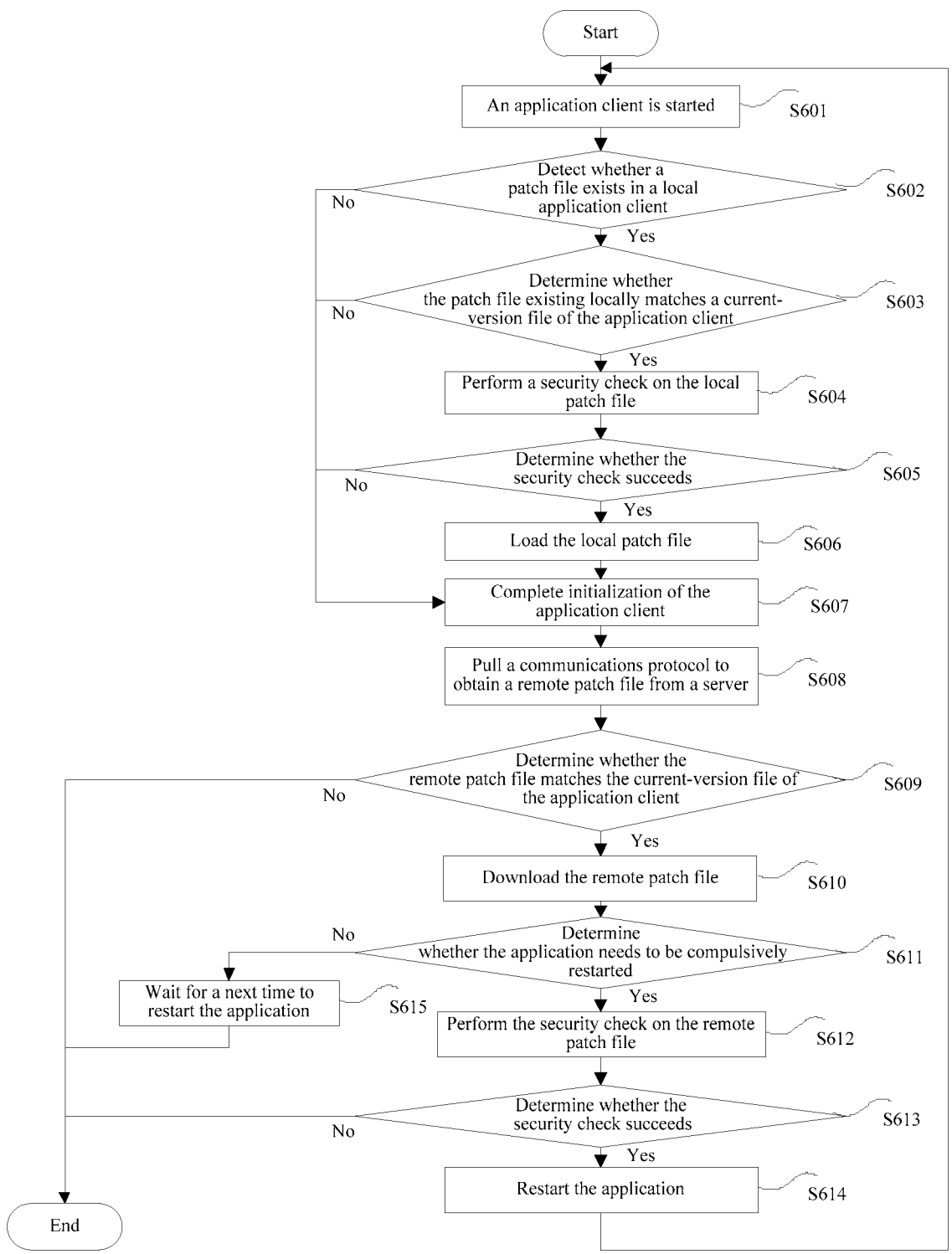
FIG. 6 is a flowchart of a preferred application update method according to some embodiments of the present disclosure.

The present disclosure further provides a preferred embodiment. FIG. 6 is a flowchart of a preferred application update method according to some embodiments of the present disclosure. As shown in FIG. 6, the preferred embodiment may include the following steps:

Step S601: An application client is started.

Step S602: Detect whether a patch file package exists in a local application client. If the patch file package exists, perform step S603; if the patch file package does not exist, perform step S607.

Step S603: Determine whether the patch file package existing locally matches a current-version of the application client. If the patch file package matches, perform step S604; if the patch file package does not match, perform step S607.

Step S604: Perform a security check on the local patch file package.

Step S605: Determine whether the security check succeeds. If the security check succeeds, perform step S606; if the security check does not succeed, perform step S607.

Step S606: Load the local patch file package.

Step S607: Complete initialization of the application client.

Step S608: Pull a communications protocol to obtain a remote patch file package from a server.

Step S609: Determine whether the remote patch file package matches the current-version of the application client. If the patch file package matches, perform step S610; if the patch file package does not match, the step is ended.

Step S610: Download the remote patch file package.

Step S611: Determine whether the application client needs to be compulsively restarted. If the application client needs to be compulsively restarted, perform step S612; if the application client does not need to be compulsively restarted, perform step S615.

Step S612: Perform the security check on the remote patch file package.

Step S613: Determine whether the security check succeeds. If the security check succeeds, perform step S614; if the security check does not succeed, the step is ended.

Step S614: Restart the application client and jump to perform step S601.

Step S615: Wait for a next time to restart the application client.

The foregoing step can be summarized to: each time the application client starts, the application client may detect whether an effective patch file package (patch.jar) exists at the local. If the patch file package does not exist, initialization is completed according to a normal procedure. In this case, a version of the application client is an initial version. After completing starting, the application client obtains update information of the application client by using a communications protocol with the application server. If new-version information exists, download a corresponding patch file package and determine whether a user operation needs to be interrupted to compulsively restart to update by using backend settings, or wait for a next time to restart and quietly update. When the application client is restarted (in this case a current-version number of the application client is still an old-version number), the application client detects that a new patch file package exists at the local. After RSA+SHA1 security check is performed on the patch file package, the patch file package is loaded and the version number is updated to a new-version number, thereby completing version update of the application client.

The application client in some embodiments of the present disclosure may be an application that can be operated in an Android system, or an application that can be operated in an IOS system. Further, some embodiments of the present disclosure is not merely applied to a Java class file, but to update of a xml resource file, a base file, and the like. Use the Android system as an example. In some embodiments of the present disclosure, based on an Android MultiDex subcontracting solution, in a usual case an Android application client includes a dex file compiled from a Java class. MultiDex is to separate one dex file into two or more (for example, classes.dex, classes1.dex, and the like). When the Android application client is started, MultiDex check may be performed and each dex file is loaded in sequence by using DexClassLoader.

In some embodiments of the present disclosure, an Android MultiDex subcontracting principle is used to compile the Java class needing to be dynamically updated into an independent dex and generate a package. In a stage when the Android application client is started, detection on the package is performed. If the package exists, the package is loaded by using DexClassLoader, so as to reach a purpose of dynamic update, reducing an update time and traffic consumption of the application client, thus largely improving update efficiency.

It should be noted that when an Android virtual machine is installed on application client Apk, the virtual machine adds a check label to a class, causing that if two related classes are in different dex files, an error is reported. To prevent the class from being added the check label and reach a purpose of dynamically updating the application client by using the dex file, some embodiments of the present disclosure can insert the following codes in a construction method of all java class files after an item is compiled:

If(AntiVerifyConfig.DO_VERIFY_CLASSES){
AntiLazyLoad.foo( );}

It should be noted that, for simple description, the foregoing method embodiments are represented as a series of actions, but persons skilled in the art should appreciate that the present disclosure is not limited to the described order of the actions because some steps may be performed in another order or performed simultaneously according to the present disclosure. In addition, a person skilled in the art should also know that all the embodiments described in this specification are preferred embodiments, and the related actions and modules are not necessarily required in the present disclosure.

Through the foregoing description of the implementations, it is clear to persons skilled in the art that the method of the foregoing embodiment may be implemented by software plus a necessary universal hardware platform, and certainly may also be implemented by hardware, but in many cases, the software implementation is preferred. Based on such an understanding, the technical solutions of the present disclosure or the part that makes contributions to the existing technology may be substantially embodied in a form of a software product. The computer software product is stored in a storage medium (for example, a ROM/RAM, a magnetic disk, or an optical disc), and includes several instructions for instructing a terminal device (which may be a mobile phone, a computer, a server, or a network device) to perform the method according to the embodiments of the present disclosure.

A method embodiment of an application update method is provided according to some embodiments of the present disclosure.

In some embodiments, the application update method may be applied to a hardware environment composed of a server 102 and a terminal 104 shown in FIG. 1. The application update method of some embodiments of the present disclosure may be performed by the server 102, or may be performed by the terminal 104, or may be together performed by the server 102 and the terminal 104. The application update method of some embodiments of the present disclosure may be performed by the terminal 104 with an application client installed on the terminal 104.

Figure 7:
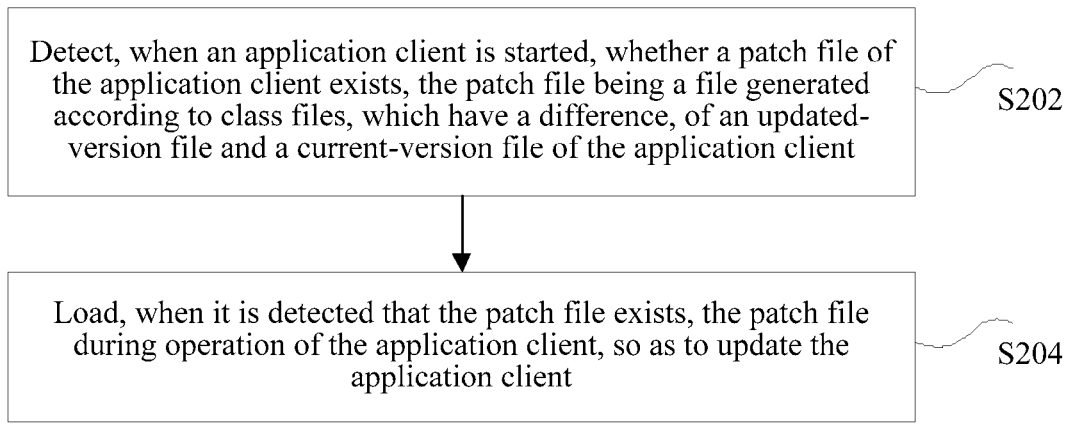
FIG. 7 is a flowchart of another optional application update method according to some embodiments of the present disclosure.

FIG. 7 is a flowchart of another optional application update method according to some embodiments of the present disclosure. As shown in FIG. 7, the method may include the following steps:

Step S202: Detect, when an application client is started, whether a patch file package of the application client exists, the patch file package being a file package generated according to class files for which an updated-version and a current-version of the application client have a difference.

Step S204: Load, when it is detected that the patch file package exists, the patch file package during operation of the application client, so as to update the application client.

In step S202 to step S204, when an application client is started, whether a patch file package generated according to class files for which an updated-version and a current-version of the application client have a difference exists is detected, and when it is detected that the patch file package exists, the patch file package is loaded during operation of the application client, so as to implement updating the application client, reaching a purpose of implementing updating the application client without interrupting a current operation of a user, so as to resolve a technical problem that in related technologies, when an application is updated, the current operation of the user needs to be interrupted to enter an installation interface, consequently reducing application update efficiency, thus implementing a technical effect of improving application update efficiency.

In the technical solution provided in step S202, some embodiments of the present disclosure does not specifically limit a type of the application client. The application client may be any type of application client installed in a client or a server, for example, an instant messaging application client. In some embodiments of the present disclosure, when the application client is started, an operated version is the current-version. In a process that the application client starts and operates the current-version, whether the patch file package of the application client exists can be detected in real time. The patch file package may be a file package generated according to the class files, which have a difference, of the updated-version and the current-version of the application client. It should be noted that the current-version of the application client may be a version being started and operated by the application client and the updated-version may be an upgraded-version of the current-version operated by the application client. For example, if the current-version started and operated by the application client is V1.0, the updated-version of the application client may be V2.0. It should further be noted that the updated-version may be a version after updating one or more class files in the current-version. Accordingly, one or more different class files may exist between the updated-version and the current-version. In some embodiments of present disclosure, these different class files are generated to one or more patch file packages and the patch file packages are used to update the application client. It should be noted that when the application client is started, the detected patch file package of the application client may be one or more.

In an actual application client scenario, a specific process of generating the patch file package according to the class files, which have a difference, of the updated-version and the current-version of the application client is shown in FIG. 3. It should be noted that Project v1.0 shown in FIG. 3 is the current-version of the application client, including class files such as A.class, B.class, C.class, and D.class. Project v2.0 is the updated-version of the application client, also including class files such as A.class, B.class, C.class, and D.class. It is assumed that class files of the updated-version Project v2.0 that are revised are B.class and D.class, as shown in a dotted-line block in FIG. 3. The class files, which have a difference, of the updated-version Project v2.0 of the application client and the current-version Project v1.0 of the application client are compared to obtain that a class file Path having a difference includes B.class and D.class. Further, these class files independently generate a dex file and package the dex file as a patch file package patch.jar.

In the technical solution provided in step S204, when the application client is started, if the application client detects that one or more patch file packages exist, some embodiments of the present disclosure can load these patch file packages during operation of the application client, so as to implement a purpose of updating the application client. It should be noted that in a process that some embodiments of the present disclosure operates the current-version, the application client loads the patch file package used for updating the application client to implement that in the process that the application client operates the current-version, application client update can be completed, reaching a purpose of implementing updating the application client without interrupting a current operation of a user, so as to resolve a technical problem that in related technologies, when an application is updated, the current operation of the user needs to be interrupted to enter an installation interface, consequently reducing application update efficiency, thus implementing a technical effect of improving update efficiency of the application client.

As an optional embodiment, step S204: Load the patch file package during operation of the application client includes: step S2041: Prioritize the patch file package before a related file in the current-version, so that when a first class file of the patch file package and a second class file of the related file have a same name, the first class file is invoked but the second class file is not invoked.

It should be noted that the related file in the current-version of the application client may include but is not limited to the class files needed in an operation process of the application client. A number of the related file may be one or more. In the optional embodiment, the first class file of the patch file package and the second class file of the related file may have a same name. As shown in FIG. 4, a first class file name of a patch file package patch.dex is Foo.class and a second class file name of a related file class.dex is also Foo.class, that is, the first class file of the patch file package patch.dex and the second class file of the related file class.dex have the same name. In this case, the optional embodiment can prioritize the patch file package patch.dex before the related file class.dex in the current-version, as shown in FIG. 4, which starts from left. When the first class file of the patch file package and the second class file of the related file have the same name, the optional embodiment prioritizes the patch file package before the related file, so that the first class file of the patch file package is invoked but the second class file of the related file is not invoked during operation of the application client when the application client loads the patch file package. The second class file of the related file may be understood as the class files in the current-version of the application client. The first class file of the patch file package may be understood as the class files that are revised compared with the current-version in the updated-version of the application client. The first class file and the second class file have the same name. The optional embodiment invokes the first class file of the patch file package instead of invoking the second class file of the related file, reaching a purpose of updating the application client in a process that the application client operates with the current-version, thus reaching an effect of improving application update efficiency.

In an actual application scenario, when the application client is started, if the application client detects that an effective patch file package exists, the detected patch file package can be loaded in a DexClassLoader manner. One DexClassLoader may include multiple dex files. Each dex file is an Element. Multiple dex files arrange a sequenced array dexElements. The dex files are traversed in sequence to find a class. In different dex, if same classes exist, a class of a dex file arranged in the front is preferably selected. Therefore, a class needing to be updated is packaged into a dex (patch.dex as shown in FIG. 4) and the dex is inserted into the foremost of the Elements, thus implementing dynamic update and upgrade of the class.

As an optional embodiment, after step S204, that is, after loading the patch file package during operation of the application client, the optional embodiment may further include: step S2061: Invoke the first class file instead of invoking the second class file if the application client detects, when receiving the invoked class files having the same name, that the patch file package is prioritized before the related file and the first class file of the patch file package and the second class file of the related file have the same name.

It should be noted that after the application client loads the patch file package during operation of the application client, the application client can detect whether the application client receives an instruction of the invoked class files having the same name in real time. When receiving the instruction of the invoked class files having the same name, the application client can further detect a location relationship of the class files having the same name. The optional embodiment may invoke the first class file instead of invoking the second class file when the application client detects that the patch file package is prioritized before the related file and the first class file of the patch file package and the second class file of the related file have the same name, as shown in FIG. 4.

The optional embodiment invokes the first class file instead of invoking the second class file when the application client detects that the patch file package is prioritized before the related file and the first class file of the patch file package and the second class file of the related file have the same name. The second class file of the related file may be understood as the class files in the current-version of the application client. The first class file of the patch file package may be understood as the class files that are revised compared with the current-version in the updated-version of the application client. The first class file and the second class file have the same name. The optional embodiment invokes the first class file of the patch file package instead of invoking the second class file of the related file, reaching a purpose of updating in a process that the application client operates with the current-version, so as to resolve a technical problem that in related technologies, when an application is updated, the current operation of the user needs to be interrupted to enter an installation interface, consequently reducing application update efficiency, thus reaching an effect of improving application update efficiency.

As an optional embodiment, when the application client does not detect the patch file package, or after the application client loads the patch file package during operation of the application client, the optional embodiment may further include the following steps:

Step S2062: Request from the application server whether a latest patch file package of the application client exists.

Step S2064: Obtain the latest patch file package from the application server if the latest patch file package exists.

Step S2066: Load the latest patch file package after the application client is restarted, so as to update the application client.

It should be noted that when the application client is started, the application client detects whether the patch file package exists, which may be, detects whether the patch file package exists at a local application client. If the patch file package does not exist at the local, the optional embodiment can request from the application server a latest patch file package of the application client, where the application server can perform support and maintenance on the application client. Alternatively, when the application client is started, the application client detects that the patch file package exists at the local, after loading the detected patch file package during operation of the application client, the application client may further request from the application server a latest version of the application client. It should be noted here that the loaded patch file package at the local during operation of the application client may not be a latest version, that is, in a process of loading the patch file package the application server may publish an updated-version of the application client to the application client, so that the optional embodiment can request from the application server the latest patch file package, so as to reach a purpose of updating the application client. When the latest patch file package exists in the application server, the application client can obtain the latest patch file package from the application server, and load the latest patch file package during operation of the application client after the application client is restarted, so as to update the application client.

The optional embodiment requests from the application server the latest patch file package of the application client, and loads the latest patch file package during operation of the application client, so as to ensure that the application client is updated to the latest version during operation of the application client, thus reaching an effect of improving application update efficiency.

As an optional embodiment, after detecting that the patch file package exists and before loading the patch file package during operation of the application client, the optional embodiment may further include: step S2031: The application client performs a security check on the patch file package. Step S204: Load the patch file package during operation of the application client includes: step S2042: The application client loads the patch file package during operation of the application client when the security check succeeds.

It should be noted that after detecting that the patch file package exists, the application client may perform the security check on the detected patch file package to ensure that the loaded patch file package during operation of the application client is a safe and reliable file, so as to improve safety and reliability of the application client. It should be noted that the optional embodiment does not specifically limit specific content of the security check performed by the application client on the patch file package. The content may include but is not limited to check whether the patch file package includes a suspected virus file, which is not described by examples herein. When the application client detects that the patch file package exists and the security check performed on the patch file package succeeds, the optional embodiment can load the patch file package during operation of the application client, so as to implement the purpose of updating the application client.

In an actual application scenario, the patch file package is downloaded and stored at the local application client or the application server as a form of a jar file, which may be tampered to reach a purpose of damaging the patch file package. Therefore, when the client detects that the patch file package exists, when downloading is done and during loading, it can be ensured that data in a buffered patch file package is not tampered by using a mechanism of RSA signature and SHA1 check. As shown in FIG. 5, an application server publishes the patch file package and applies to perform the security check on the patch file package. Specifically, first perform SHA1 calculation to all files in a patch file package patch.jar, such as class.dex and version.txt to generate a verify.txt file, and then use a private key to sign verify.txt to generate a verify.signature file. An application client can download the patch file package patch.jar from the application server and store the patch file package patch.jar at a local. Before loading the patch file package patch.jar, use a public key to check the verify.txt file and perform SHA1 check to all files in the patch file package patch.jar. The application client loads the patch file package patch.jar to implement updating the application client when the check succeeds. It should be noted that SHA1 algorithm is a mature algorithm in the existing technology, which is not specifically limited in some embodiments of the present disclosure and is not described herein.

As an optional embodiment, after the application client detects that the patch file package exists and before loading the patch file package during operation of the application client, the optional embodiment may further include: step S2032: The application client determines whether the patch file package matches the current-version. Step S204: Load the patch file package during operation of the application client includes: step S2043: Load the patch file package when the patch file package matches the current-version.

It should be noted that after the application client detects that the patch file package exists, the application client can determine whether the detected patch file package matches the current-version. It should be noted that the optional embodiment does not specifically limit content that application client detects whether patch file package matches the current-version, which may be, the application client detects whether the patch file package is an updated file of the current-version, which is not described by examples herein. The optional embodiment determines whether the patch file package matches the current-version, so as to ensure that the application client can implement accurate update, thus avoiding that the application client is updated to a wrong version. When the patch file package matches the current-version, the optional embodiment can load the patch file package, so as to update the application client. After the optional embodiment detects that the patch file package exists, the application client determines whether the patch file package matches the current-version, so as to improve accuracy of updating the application client, thus improving performance of the updated application client.

Based on the above, in some embodiments, a method for updating an application client is performed at a computing device having one or more processors and memory. The computing device detects that an application client is started at the computing device (e.g., the user has double clicked on the application client to open the application client). In response to detecting that the application client is started at the computing device, the computing device determines whether an application patch file package exists for the application client at the computing device. In accordance with a determination that the application patch file package (e.g., patch.jar) exists for the application client at the computing device: the computing device invokes a DexClassLoader to load one or more dex (Dalvik Executable) files generated from one or more class files for which an updated version and a current version of the application client have a difference, wherein the one or more dex files were generated (e.g., by an application server for the application client) and included in the application patch file package based on identification of class files in the current version of the application client that have been updated in the updated version of the application client; and the computing device initializes the application client by inserting each of the one or more dex files in front of existing dex files of a corresponding application component in the current version of the application client, such that invocation of corresponding class files for the one or more classes in the current version of the application client is bypassed during the initializing of the application client. In accordance with a determination that the application patch file package (e.g., patch.jar) does not exists for the application client at the computing device: the computing device completes initialization of the application client without updating the current version of the application client.

In some embodiments, after completing the initialization of the application client without updating the current version of the application client, the computing device connects to an application server corresponding to the application client to request new version information for the application client. In accordance with a determination that an updated version of the application client exists at the application server based on the new version information obtained from the application server, the computing device downloads a latest patch file package for the application client from the application server, wherein the latest patch file package includes at least a first dex file generated from a first class file for which the latest version of the application client and the current version of the application client has a difference, and wherein the latest patch file package does not include at least a second dex file generated from a second class file for which the latest version of the application client and the current version of the application client do not have a difference. In some embodiments, in accordance with a determination that an updated version of the application client exists at the application server based on the new version information obtained from the application server, the computing device requests configuration information regarding whether update requires a restart of the application client. In accordance with a determination that the update does not require a restart of the application client, the computing device stores the latest patch file package at the computing device for updating the application client during initialization when the application client is started next time, without interrupting operation of the application client. In accordance with a determination that the update requires a restart of the application client, the computing device prompts for user confirmation regarding whether to update the application client.

In some embodiments, in accordance with a determination that the application patch file package exists for the application client at the computing device: prior to invoking the DexClassLoader to load the one or more dex files generated from the one or more class files for which the updated version and the current version of the application client have a difference, the computing device performs security verification of the patch file package.

In some embodiments, the one or more dex files in the patch file package do not overwrite any files of the current version of the application client at the computing device.

In some embodiments, the one or more classes are updated without deleting the class files corresponding to the one or more classes in the current version of the application client.

Various details are described in various embodiments, and are applicable to other embodiments described herein. The features described in various embodiments may be combined without limitation and are not repeated in the interest of brevity. It should be noted that, for simple description, the foregoing method embodiments are represented as a series of actions, but persons skilled in the art should appreciate that the present disclosure is not limited to the described order of the actions because some steps may be performed in another order or performed simultaneously according to the present disclosure. In addition, a person skilled in the art should also know that all the embodiments described in this specification are preferred embodiments, and the related actions and modules are not necessarily required in the present disclosure.

Through the foregoing description of the implementations, it is clear to persons skilled in the art that the method of the foregoing embodiment may be implemented by software plus a necessary universal hardware platform, and certainly may also be implemented by hardware, but in many cases, the software implementation is preferred. Based on such an understanding, the technical solutions of the present disclosure or the part that makes contributions to the existing technology may be substantially embodied in a form of a software product. The computer software product is stored in a storage medium (for example, a ROM/RAM, a magnetic disk, or an optical disc), and includes several instructions for instructing a terminal device (which may be a mobile phone, a computer, a server, or a network device) to perform the method according to the embodiments of the present disclosure.

Figure 8:
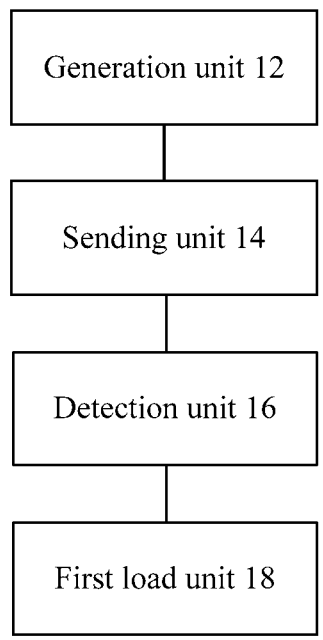
FIG. 8 is a schematic diagram of an optional application update apparatus according to some embodiments of the present disclosure.

According to some embodiments of the present disclosure, an application update apparatus configured to implement an application update method in various embodiments of the present disclosure is further provided. FIG. 8 is a schematic diagram of an optional application update apparatus according to some embodiments of the present disclosure. As shown in FIG. 8, the apparatus may include:

a generation unit 12, configured to generate, by an application server, a patch file package according to class files for which an updated-version and a current-version of an application client; a sending unit 14, configured to send, by the application server, the generated patch file package to the application client; a detection unit 16, configured to detect, when the application client is started, whether the patch file package exists; and a first load unit 18, configured to load, when the application client detects that the patch file package exists, the patch file package during operation of the application client, so as to update the application client.

It should be noted that: the generation unit 12 in this embodiment may be configured to perform step S102 in Various embodiments of this application; the sending unit 14 in this embodiment may be configured to perform step S104 in Various embodiments of this application; the detection unit 16 in this embodiment may be configured to perform step S106 in Various embodiments of this application; and the first load unit 18 in this embodiment may be configured to perform step S108 in Various embodiments of this application.

It should be noted here that the foregoing modules and corresponding steps implement same examples and application scenarios, but are not limited to what is disclosed in Various embodiments. It should be noted that as a part of the apparatus, the foregoing modules may be executed in the hardware environment shown in FIG. 1 and can be implemented by software, or can be implemented by hardware. The hardware environment includes a network environment.

Figure 9:
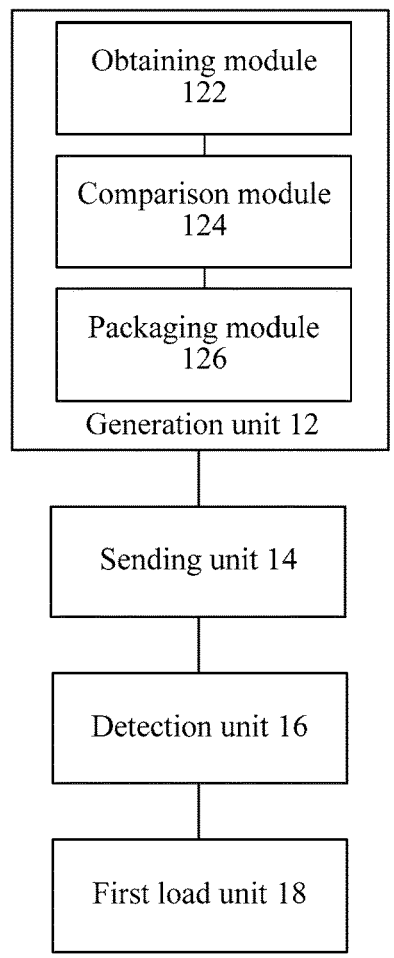
FIG. 9 is a schematic diagram of another optional application update apparatus according to some embodiments of the present disclosure.

As an optional embodiment, FIG. 9 is a schematic diagram of another optional application update apparatus according to some embodiments of the present disclosure. As shown in FIG. 9, the generation unit 12 may include: an obtaining module 122, configured to obtain, by the application server, the updated-version and the current-version of the application client; a comparison module 124, configured to compare the updated-version and the current-version of the application client, to obtain the class files for which the updated-version and the current-version of the application client have a difference; and a packaging module 126, configured to package the class files as the patch file package.

It should be noted that: the obtaining module 122 in this embodiment may be configured to perform step S1022 in Various embodiments of this application; the comparison module 124 in this embodiment may be configured to perform step S1024 in Various embodiments of this application; and the packaging module 126 in this embodiment may be configured to perform step S1026 in Various embodiments of this application.

It should be noted here that the foregoing modules and corresponding steps implement same examples and application scenarios, but are not limited to what is disclosed in Various embodiments. It should be noted that as a part of the apparatus, the foregoing modules may be executed in the hardware environment shown in FIG. 1 and can be implemented by software, or can be implemented by hardware. The hardware environment includes a network environment.

Figure 10:
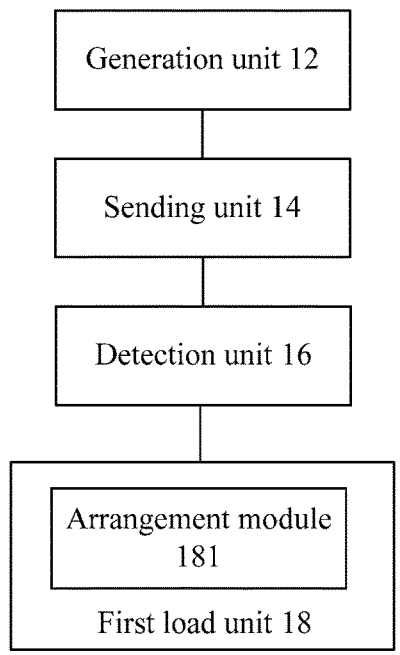
FIG. 10 is a schematic diagram of another optional application update apparatus according to some embodiments of the present disclosure.

As an optional embodiment, FIG. 10 is a schematic diagram of another optional application update apparatus according to some embodiments of the present disclosure. As shown in FIG. 10, the first load unit 18 may include an arrangement module 181, configured to prioritize, by the application client, the patch file package before a related file in the current-version, so that when a first class file of the patch file package and a second class file of the related file have a same name, the first class file is invoked but the second class file is not invoked.

It should be noted that the arrangement module 181 in this embodiment may be configured to perform step S1081 in Various embodiments of this application. It should be noted here that the foregoing modules and corresponding steps implement same examples and application scenarios, but are not limited to what is disclosed in Various embodiments. It should be noted that as a part of the apparatus, the foregoing modules may be executed in the hardware environment shown in FIG. 1 and can be implemented by software, or can be implemented by hardware. The hardware environment includes a network environment.

Figure 11:
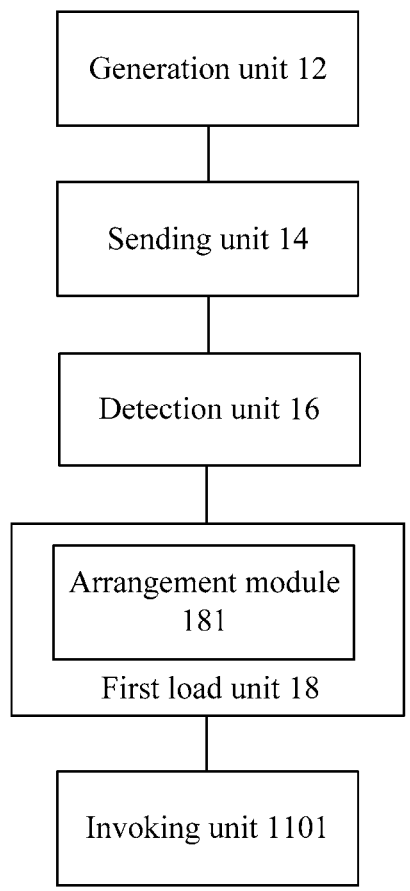
FIG. 11 is a schematic diagram of another optional application update apparatus according to some embodiments of the present disclosure.

As an optional embodiment, FIG. 11 is a schematic diagram of another optional application update apparatus according to some embodiments of the present disclosure. As shown in FIG. 11, the optional embodiment may further include an invoking unit 1101, configured to: after the application client loads the patch file package during operation of the application client, invoke the first class file instead of invoking the second class file if the application client detects, when receiving the invoked class files having the same name, that the patch file package is prioritized before the related file and the first class file of the patch file package and the second class file of the related file have the same name.

It should be noted that the invoking unit 1101 in this embodiment may be configured to perform step S1101 in Various embodiments of this application. It should be noted here that the foregoing modules and corresponding steps implement same examples and application scenarios, but are not limited to what is disclosed in Various embodiments. It should be noted that as a part of the apparatus, the foregoing modules may be executed in the hardware environment shown in FIG. 1 and can be implemented by software, or can be implemented by hardware. The hardware environment includes a network environment.

Figure 12:
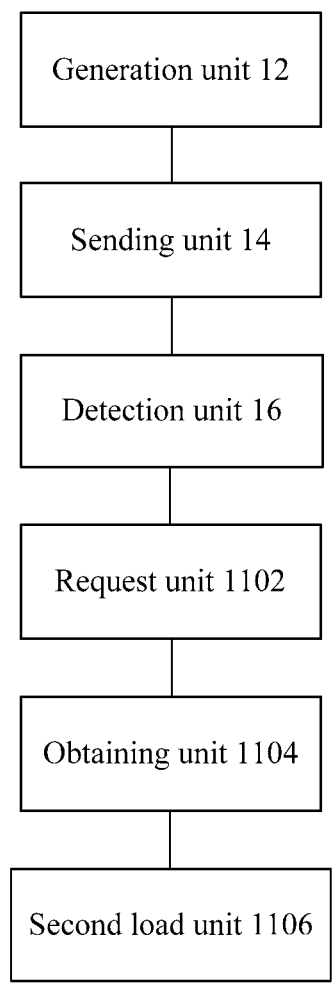
FIG. 12 is a schematic diagram of another optional application update apparatus according to some embodiments of the present disclosure.

As an optional embodiment, FIG. 12 is a schematic diagram of another optional application update apparatus according to some embodiments of the present disclosure. As shown in FIG. 12, the optional embodiment may further include a request unit 1102, configured to request, by the application client from the application server when the application client does not detect the patch file package or after the application client loads the patch file package during operation of the application client, whether a latest patch file package of the application client exists; an obtaining unit 1104, configured to obtain, by the application client, the latest patch file package from the application server if the latest patch file package exists; and a second load unit 1106, configured to load, by the application client, the latest patch file package after the application client is restarted, so as to update the application client.

It should be noted that: the request unit 1102 in this embodiment may be configured to perform step S1102 in Various embodiments of this application; the obtaining unit 1104 in this embodiment may be configured to perform step S1104 in Various embodiments of this application; and the second load unit 1106 in this embodiment may be configured to perform step S1106 in Various embodiments of this application.

It should be noted here that the foregoing modules and corresponding steps implement same examples and application scenarios, but are not limited to what is disclosed in Various embodiments. It should be noted that as a part of the apparatus, the foregoing modules may be executed in the hardware environment shown in FIG. 1 and can be implemented by software, or can be implemented by hardware. The hardware environment includes a network environment.

Figure 13:
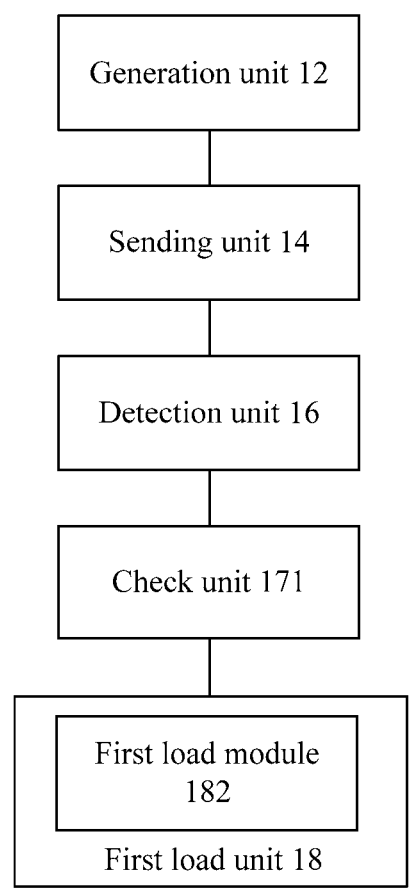
FIG. 13 is a schematic diagram of another optional application update apparatus according to some embodiments of the present disclosure.

As an optional embodiment, FIG. 13 is a schematic diagram of another optional application update apparatus according to some embodiments of the present disclosure. As shown in FIG. 13, the optional embodiment may further include a check unit 171, configured to perform, by the application client, a security check on the patch file package after the application client detects that the patch file package exists and before the application client loads the patch file package during operation of the application client. The first load unit 18 includes a first load module 182, configured to load, by the application client, the patch file package during operation of the application client when the security check succeeds.

It should be noted that: the check unit 171 in this embodiment may be configured to perform step S1071 in Various embodiments of this application; and the first load module 182 in this embodiment may be configured to perform step S1082 in Various embodiments of this application.

It should be noted here that the foregoing modules and corresponding steps implement same examples and application scenarios, but are not limited to what is disclosed in Various embodiments. It should be noted that as a part of the apparatus, the foregoing modules may be executed in the hardware environment shown in FIG. 1 and can be implemented by software, or can be implemented by hardware. The hardware environment includes a network environment.

Figure 14:
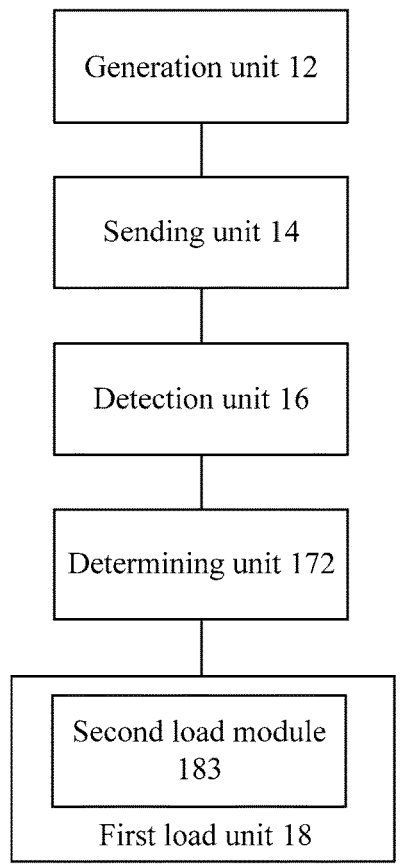
FIG. 14 is a schematic diagram of another optional application update apparatus according to some embodiments of the present disclosure.

As an optional embodiment, FIG. 14 is a schematic diagram of another optional application update apparatus according to some embodiments of the present disclosure. As shown in FIG. 14, the optional embodiment may further include a determining unit 172, configured to: after the application client detects that the patch file package exists and before the application client loads the patch file package during operation of the application client, determine, by the application client, whether the patch file package matches the current-version. The first load unit 18 includes a second load module 183, configured to load, by the application client, the patch file package when the patch file package matches the current-version.

It should be noted that: the determining unit 172 in this embodiment may be configured to perform step S1072 in Various embodiments of this application; and the second load module 183 in this embodiment may be configured to perform step S1083 in Various embodiments of this application.

It should be noted here that the foregoing modules and corresponding steps implement same examples and application scenarios, but are not limited to what is disclosed in Various embodiments. It should be noted that as a part of the apparatus, the foregoing modules may be executed in the hardware environment shown in FIG. 1 and can be implemented by software, or can be implemented by hardware. The hardware environment includes a network environment.

By using the foregoing modules, a technical problem that in related technologies, when an application is updated, a current operation of a user needs to be interrupted to enter an installation interface, consequently reducing application update efficiency is resolved, thus reaching a technical effect of improving application update efficiency.

Figure 15:
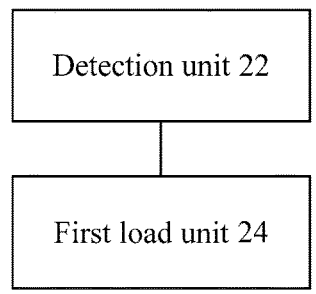
FIG. 15 is a schematic diagram of an optional application update apparatus according to some embodiments of the present disclosure.

According to some embodiments of the present disclosure, an application update apparatus configured to implement an application update method in Various embodiments of the present disclosure is further provided. FIG. 15 is a schematic diagram of an optional application update apparatus according to some embodiments of the present disclosure. As shown in FIG. 15, the apparatus may include:

a detection unit 22, configured to detect, when an application client is started, whether a patch file package of the application client exists, the patch file package being a file package generated according to class files for which an updated-version and a current-version of the application client have a difference; and a first load unit 24, configured to load, when it is detected that the patch file package exists, the patch file package during operation of the application client, so as to update the application client.

It should be noted that: the detection unit 22 in this embodiment may be configured to perform step S202 in Various embodiments of this application; and the first load unit 24 in this embodiment may be configured to perform step S204 in Various embodiments of this application.

It should be noted here that the foregoing modules and corresponding steps implement same examples and application scenarios, but are not limited to what is disclosed in Various embodiments. It should be noted that as a part of the apparatus, the foregoing modules may be executed in the hardware environment shown in FIG. 1 and can be implemented by software, or can be implemented by hardware. The hardware environment includes a network environment.

Figure 16:
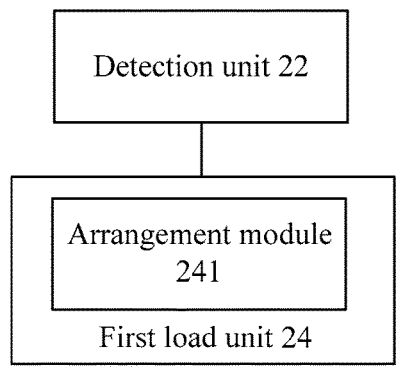
FIG. 16 is a schematic diagram of another optional application update apparatus according to some embodiments of the present disclosure.

As an optional embodiment, FIG. 16 is a schematic diagram of another optional application update apparatus according to some embodiments of the present disclosure. As shown in FIG. 16, a first load unit 24 may include an arrangement module 241, configured to prioritize the patch file package before a related file in the current-version, so that when a first class file of the patch file package and a second class file of the related file have a same name, the first class file is invoked but the second class file is not invoked.

It should be noted that the arrangement module 241 in this embodiment may be configured to perform step S2041 in Various embodiments of this application. It should be noted here that the foregoing modules and corresponding steps implement same examples and application scenarios, but are not limited to what is disclosed in Various embodiments. It should be noted that as a part of the apparatus, the foregoing modules may be executed in the hardware environment shown in FIG. 1 and can be implemented by software, or can be implemented by hardware. The hardware environment includes a network environment.

Figure 17:
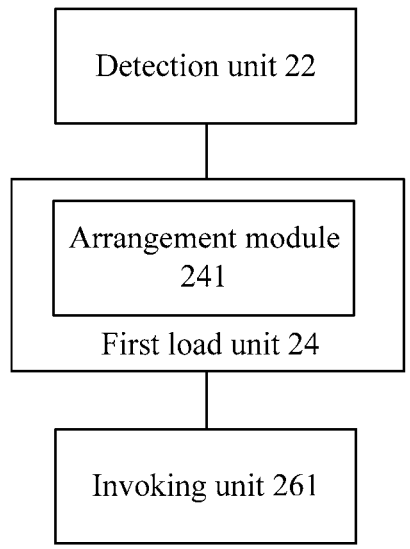
FIG. 17 is a schematic diagram of another optional application update apparatus according to some embodiments of the present disclosure.

As an optional embodiment, FIG. 17 is a schematic diagram of another optional application update apparatus according to some embodiments of the present disclosure. As shown in FIG. 17, the optional embodiment may further include an invoking unit 261, configured to: after the application client loads the patch file package during operation of the application client, invoke the first class file instead of invoking the second class file if the application client detects, when receiving the invoked class files having the same name, that the patch file package is prioritized before the related file and the first class file of the patch file package and the second class file of the related file have the same name.

It should be noted that the invoking unit 261 in this embodiment may be configured to perform step S2061 in Various embodiments of this application. It should be noted here that the foregoing modules and corresponding steps implement same examples and application scenarios, but are not limited to what is disclosed in Various embodiments. It should be noted that as a part of the apparatus, the foregoing modules may be executed in the hardware environment shown in FIG. 1 and can be implemented by software, or can be implemented by hardware. The hardware environment includes a network environment.

Figure 18:
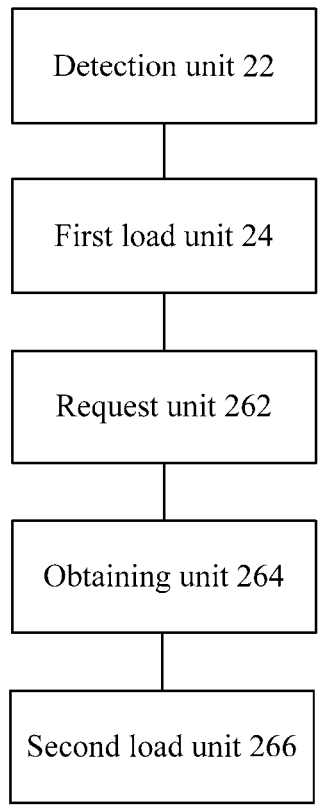
FIG. 18 is a schematic diagram of another optional application update apparatus according to some embodiments of the present disclosure.

As an optional embodiment, FIG. 18 is a schematic diagram of another optional application update apparatus according to some embodiments of the present disclosure. As shown in FIG. 18, the optional embodiment may further include a request unit 262, configured to request, from the server when the application client does not detect the patch file package or after the application client loads the patch file package during operation of the application client, whether a latest patch file package of the application client exists; an obtaining unit 264, configured to obtain the latest patch file package from the server if the latest patch file package exists; and a second load unit 266, configured to load the latest patch file package after the application client is restarted, so as to update the application client.

It should be noted that: the request unit 262 in this embodiment may be configured to perform step S2062 in Various embodiments of this application; the obtaining unit 264 in this embodiment may be configured to perform step S2064 in Various embodiments of this application; and the second load unit 266 in this embodiment may be configured to perform step S2066 in Various embodiments of this application.

It should be noted here that the foregoing modules and corresponding steps implement same examples and application scenarios, but are not limited to what is disclosed in Various embodiments. It should be noted that as a part of the apparatus, the foregoing modules may be executed in the hardware environment shown in FIG. 1 and can be implemented by software, or can be implemented by hardware. The hardware environment includes a network environment.

Figure 19:
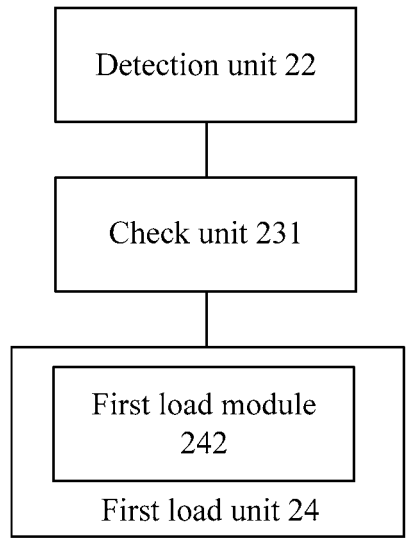
FIG. 19 is a schematic diagram of another optional application update apparatus according to some embodiments of the present disclosure.

As an optional embodiment, FIG. 19 is a schematic diagram of another optional application update apparatus according to some embodiments of the present disclosure. As shown in FIG. 19, the optional embodiment may further include a check unit 231, configured to perform a security check on the patch file package after the application client detects that the patch file package exists and before the application client loads the patch file package during operation of the application client. A first load unit 24 may include a first load module 242, configured to load the patch file package during operation of the application client when the security check succeeds.

It should be noted that: the check unit 231 in this embodiment may be configured to perform step S2031 in Various embodiments of this application; and the first load module 242 in this embodiment may be configured to perform step S2042 in Various embodiments of this application. It should be noted here that the foregoing modules and corresponding steps implement same examples and application scenarios, but are not limited to what is disclosed in Various embodiments. It should be noted that as a part of the apparatus, the foregoing modules may be executed in the hardware environment shown in FIG. 1 and can be implemented by software, or can be implemented by hardware. The hardware environment includes a network environment.

Figure 20:
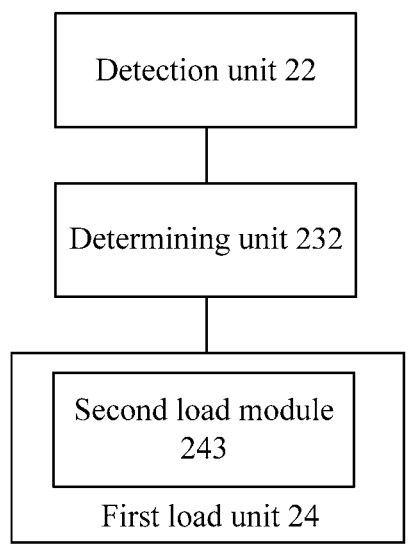
FIG. 20 is a schematic diagram of another optional application update apparatus according to some embodiments of the present disclosure.

As an optional embodiment, FIG. 20 is a schematic diagram of another optional application update apparatus according to some embodiments of the present disclosure. As shown in FIG. 20, the optional embodiment may further include a determining unit 232, configured to: after the application client detects that the patch file package exists and before the application client loads the patch file package during operation of the application client, determine whether the patch file package matches the current-version. A first load unit 24 may include a second load module 243, configured to load the patch file package when the patch file package matches the current-version.

It should be noted that: the determining unit 232 in this embodiment may be configured to perform step S2032 in Various embodiments of this application; and the second load module 243 in this embodiment may be configured to perform step S2043 in Various embodiments of this application.

It should be noted here that the foregoing modules and corresponding steps implement same examples and application scenarios, but are not limited to what is disclosed in Various embodiments. It should be noted that as a part of the apparatus, the foregoing modules may be executed in the hardware environment shown in FIG. 1 and can be implemented by software, or can be implemented by hardware. The hardware environment includes a network environment.

By using the foregoing modules, a technical problem that in related technologies, when an application is updated, a current operation of a user needs to be interrupted to enter an installation interface, consequently reducing application update efficiency is resolved, thus reaching a technical effect of improving application update efficiency.

A terminal configured to implement the foregoing application update method is further provided according to some embodiments of the present disclosure.

Figure 21:
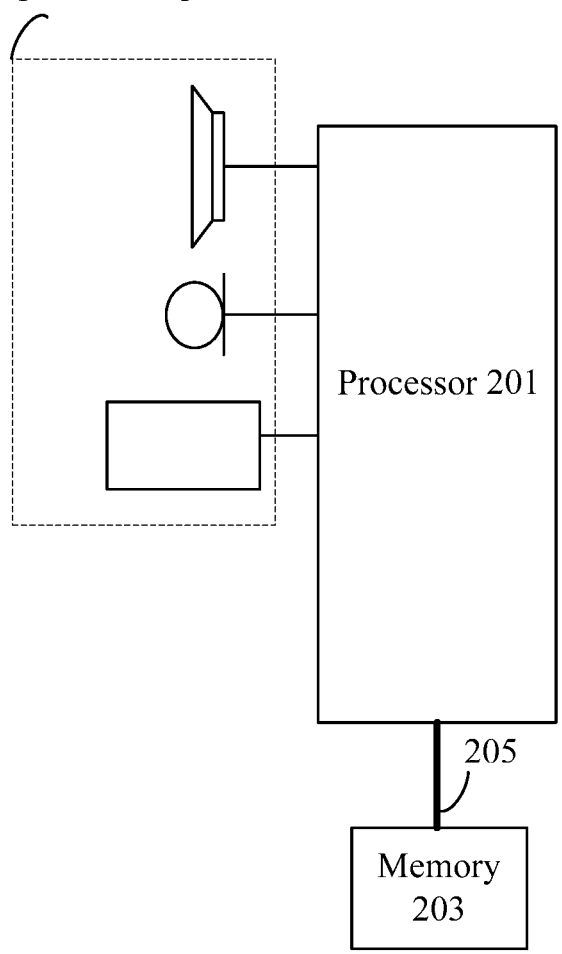
FIG. 21 is a structural block diagram of a terminal according to some embodiments of the present disclosure.

FIG. 21 is a structural block diagram of a terminal according to some embodiments of the present disclosure. As shown in FIG. 21, the terminal may include: one or more (merely one is shown in the figure) processors 201, a memory 203, and a transmission apparatus 205. As shown in FIG. 21, the terminal may further include an input and output device 207.

The memory 203 may be configured to store a software program and a module, for example, a program instruction/module corresponding to an application update method and apparatus in some embodiments of the present disclosure. The processor 201 performs various functional applications and data processing by running the software program and the module stored in the memory 203, that is, implementing the foregoing application update method. The memory 203 may include a high-speed random memory, and may also include a nonvolatile memory such as one or more magnetic storage devices, a flash memory, or another nonvolatile solid-state memory. In some embodiments, the memory 203 may further include memories remotely disposed relative to the processor 201, and these remote memories may be connected to the terminal through a network. Instances of the network include, but are not limited to, the Internet, an intranet, a local area network, a mobile communications network, and a combination thereof.

The transmission apparatus 205 is configured to receive or send data through a network, or may further be configured to transmit data between a processor and a memory. Specific examples of the foregoing network may include a wired network and a wireless network. In an example, the transmission apparatus 205 includes a network interface controller (NIC) that may be connected to another network device and a router by using a network cable, thereby communicating with the Internet or a local area network. In an example, the transmission apparatus 205 is a radio frequency (RF) module configured to communicate with the Internet in a wireless manner.

Specifically, the memory 203 is configured to store an application program.

The processor 201 may invoke the application program stored in the memory 203 by using the transmission apparatus 205 to perform the following steps: generating, by an application server, a patch file package according to class files for which an updated-version and a current-version of an application client; sending, by the application server, the generated patch file package to the application client; detecting, by the application client when the application client is started, whether the patch file package exists; and loading, by the application client in accordance with a determination that the patch file package exists, the patch file package during operation of the application client, so as to update the application client.

The processor 201 is further configured to perform the following steps: obtaining, by the application server, the updated-version and the current-version of the application client; comparing the updated-version and the current-version of the application client, to obtain the class files for which the updated-version and the current-version of the application client have a difference; and packaging the class files as the patch file package.

The processor 201 is further configured to perform the following step: prioritizing, by the application client, the patch file package before a related file in the current-version, so that when a first class file of the patch file package and a second class file of the related file have a same name, the first class file is invoked but the second class file is not invoked.

The processor 201 is further configured to perform the following step: after the loading, by the application client, the patch file package during operation of the application client, invoking, by the application client, the first class file instead of invoking the second class file if the application client detects, when receiving the invoked class files having the same name, that the patch file package is prioritized before the related file and the first class file of the patch file package and the second class file of the related file have the same name.

The processor 201 is further configured to perform the following steps: when the application client does not detect the patch file package, or after the loading, by the application client, the patch file package during operation of the application client, requesting, by the application client from the application server, whether a latest patch file package of the application client exists; obtaining, by the application client, the latest patch file package from the application server if the latest patch file package exists; and loading, by the application client, the latest patch file package after the application client is restarted, so as to update the application client.

The processor 201 is further configured to perform the following steps: after the application client detects that the patch file package exists and before the loading, by the application client, the patch file package during operation of the application client, performing, by the application client, a security check on the patch file package; and the loading, by the application client, the patch file package during operation of the application client includes: loading, by the application client, the patch file package during operation of the application client when the security check succeeds.

The processor 201 is further configured to perform the following steps: after the application client detects that the patch file package exists and before the loading, by the application client, the patch file package during operation of the application client, determining, by the application client, whether the patch file package matches the current-version; and the loading, by the application client, the patch file package during operation of the application client includes: loading, by the application client, the patch file package when the patch file package matches the current-version.

A solution of application update is provided according to some embodiments of the present disclosure. When an application client is started, whether a patch file package generated according to class files for which an updated-version and a current-version of the application client have a difference exists is detected, and when it is detected that the patch file package exists, the patch file package is loaded during operation of the application client, so as to implement updating the application client, reaching a purpose of implementing updating the application client without interrupting a current operation of a user, thus implementing a technical effect of improving update efficiency of the application client, so as to resolve a technical problem that in related technologies, when an application is updated, the current operation of the user needs to be interrupted to enter an installation interface, consequently reducing application update efficiency.

In some embodiments, a specific example in this embodiment may refer to the examples described in Various embodiments to Various embodiments, and details are not described herein again in this embodiment.

Persons of ordinary skill in the art may understand that, the structure shown in FIG. 21 is only schematic. The terminal may be a terminal device such as a smartphone (such as an Android mobile phone or an iOS mobile phone), a tablet computer, a palmtop computer, mobile Internet devices (MID), or a PAD. FIG. 21 does not limit the structure of the foregoing electronic apparatus. For example, the terminal may further include more or less components (such as a network interface and a display apparatus) than those shown in FIG. 21, or has a configuration different from that shown in FIG. 21.

Persons of ordinary skill in the art may understand that all or a part of the steps of the methods of the foregoing embodiments may be implemented by a program instructing relevant hardware of the terminal device. The program may be stored in a computer readable storage medium. The storage medium may be a flash disk, a read-only memory (ROM), a random access memory (RAM), a magnetic disk, or an optical disc.

Some embodiments of the present disclosure further provides a storage medium. In some embodiments, the storage medium may be used for performing program code of an application update method.

In some embodiments, the storage medium may be located on at least one network device in multiple network devices in a network shown in the foregoing embodiment.

In some embodiments, the storage medium is configured to store program code used to execute the following steps:

S1: An application server generates a patch file package according to class files for which an updated-version and a current-version of an application client.

S2: The application server sends the generated patch file package to the application client.

S3: The application client detects, when the application client is started, whether the patch file package exists.

S4: The application client loads, in accordance with a determination that the patch file package exists, the patch file package during operation of the application client, so as to update the application client.

In some embodiments, the storage medium is further configured to store program code used to execute the following steps: obtaining, by the application server, the updated-version and the current-version of the application client; comparing the updated-version and the current-version of the application client, to obtain the class files for which the updated-version and the current-version of the application client have a difference; and packaging the class files as the patch file package.

In some embodiments, the storage medium is further configured to store program code used to execute the following steps: prioritizing, by the application client, the patch file package before a related file in the current-version, so that when a first class file of the patch file package and a second class file of the related file have a same name, the first class file is invoked but the second class file is not invoked.

In some embodiments, the storage medium is further configured to store program code used to execute the following steps: after the loading, by the application client, the patch file package during operation of the application client, invoking, by the application client, the first class file instead of invoking the second class file if the application client detects, when receiving the invoked class files having the same name, that the patch file package is prioritized before the related file and the first class file of the patch file package and the second class file of the related file have the same name.

In some embodiments, the storage medium is further configured to store program code used to execute the following steps: when the application client does not detect the patch file package, or after the loading, by the application client, the patch file package during operation of the application client, requesting, by the application client from the application server, whether a latest patch file package of the application client exists; obtaining, by the application client, the latest patch file package from the application server if the latest patch file package exists; and loading, by the application client, the latest patch file package after the application client is restarted, so as to update the application client.

In some embodiments, the storage medium is further configured to store program code used to execute the following steps: after the application client detects that the patch file package exists and before the loading, by the application client, the patch file package during operation of the application client, performing, by the application client, a security check on the patch file package; and the loading, by the application client, the patch file package during operation of the application client includes: loading, by the application client, the patch file package during operation of the application client when the security check succeeds.

In some embodiments, the storage medium is further configured to store program code used to execute the following steps: after the application client detects that the patch file package exists and before the loading, by the application client, the patch file package during operation of the application client, determining, by the application client, whether the patch file package matches the current-version; and the loading, by the application client, the patch file package during operation of the application client includes: loading, by the application client, the patch file package when the patch file package matches the current-version.

In some embodiments, a specific example in this embodiment may refer to the examples described various embodiments, and details are not described herein again in this embodiment.

In some embodiments, the foregoing storage medium may include but is not limited to: any medium that can store program code, such as a U disk, a read-only memory (ROM), a random access memory (RAM), a removable hard disk, a magnetic disk, or an optical disc.

The sequence numbers of the preceding embodiments of the present disclosure are merely for description purpose but do not indicate the preference of the embodiments.

When the integrated unit in the foregoing embodiment is implemented in a form of a software functional module and sold or used as an independent product, the integrated unit may be stored in the foregoing computer-readable storage medium. Based on such an understanding, the technical solutions of the present disclosure, or the part that makes contributions to the existing technology, or all or some of the technical solutions may be substantially embodied in a form of a software product. The computer software product is stored in a storage medium and includes several instructions for instructing one or more computer devices (which may be a personal computer, a server, or a network device) to perform all or some of the steps of the methods in the embodiments of the present disclosure.

In the foregoing embodiments of the present disclosure, the description of each embodiment has respective focuses, and for the part that is not detailed in some embodiments, reference may be made to the relevant description of other embodiments.

In the several embodiments provided in this application, it should be understood that the disclosed client may be implemented in other manners. The described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The foregoing descriptions are merely preferred implementations of the present disclosure. It should be noted that a person of ordinary skill in the art may make several improvements or polishing without departing from the principle of the present disclosure and the improvements or polishing shall fall within the protection scope of the present disclosure.

What is claimed is:

1. A method, comprising:
at a computing device having one or more processors and memory:
detecting that an application client is started at the computing device, wherein the application client comprises a current version and includes one or more Dalvik Executable (dex) class files in the current version;
in response to detecting that the application client is started at the computing device, determining whether an application patch file package exists for the application client locally at the computing device, wherein:
the application patch file package is generated by an application server and downloaded to the computing device prior to the starting of the application client;
the application patch file package corresponds to an updated version of the application client; and
the updated version of the application client includes one or more dex class files, each dex class file in the updated version of the application client having an identical class name as a corresponding dex class file in the current version of the application client and having modified content from the corresponding dex class file;
in accordance with a determination that the application patch file package exists for the application client locally at the computing device:
traversing, in sequence, the one or more dex class files in the application patch file package and inserting, into the application client, each of the one or more dex class files having a respective identical class name in front of each of existing dex class files of a corresponding application component in the current version of the application client having the respective identical class name; and
initializing the application client by (i) invoking each of the one or more dex class files having the respective identical class name and corresponding to the updated version of the application client and (ii) bypassing invocation of the corresponding dex class files in the current version of the application client having the identical class name.

2. The method of claim 1, further comprising:
in accordance with a determination that the application patch file package does not exist for the application client locally at the computing device, completing initialization of the application client without updating the current version of the application client;
after completing the initialization of the application client without updating the current version of the application client, connecting to the application server to request new version information for the application client; and
in accordance with a determination that a new version of the application client exists at the application server based on the new version information obtained from the application server, downloading a latest patch file package for the application client from the application server, wherein the latest patch file package includes at least a first executable file generated from a first class file for which there is a difference between a latest version of the application client and the current version of the application client, and wherein the latest patch file package does not include at least a second executable file generated from a second class file for which the latest version of the application client and the current version of the application client do not have a difference.

3. The method of claim 2, further comprising:
in accordance with a determination that the new version of the application client exists at the application server based on the new version information obtained from the application server, requesting configuration information regarding whether update requires a restart of the application client; and
in accordance with a determination that the update does not require a restart of the application client, storing the latest patch file package at the computing device for updating the application client during initialization when the application client is started next time, without interrupting operation of the application client.

4. The method of claim 3, further comprising:
in accordance with a determination that the update requires a restart of the application client, prompting for user confirmation regarding whether to update the application client.

5. The method of claim 1, further comprising:
in accordance with a determination that the application patch file package exists for the application client locally at the computing device,
performing security verification of the patch file package.

6. The method of claim 1, wherein the one or more dex class files in the updated version of the application client do not overwrite any files of the current version of the application client at the computing device.

7. The method of claim 1, further comprising updating the one or more corresponding dex class files in the current version of the application client with the one or more dex class files in the updated version of the application client without deleting the one or more corresponding dex class files.

8. A computing device, comprising:
one or more processors;
memory; and
a plurality of instructions stored in the memory that, when executed by the one or more processors, cause the computing device to perform operations comprising:
detecting that an application client is started at the computing device, wherein the application client comprises a current version and includes one or more dex class files in the current version;
in response to detecting that the application client is started at the computing device, determining whether an application patch file package exists for the application client locally at the computing device, wherein:
the application patch file package is generated by an application server and downloaded to the computing device prior to the starting of the application client;
the application patch file package corresponds to an updated version of the application client; and
the updated version of the application client includes one or more dex class files, each dex class file having an identical class name as a corresponding dex class file in the current version of the application client and having modified content from the corresponding dex class file;
in accordance with a determination that the application patch file package exists for the application client locally at the computing device:

invoking a DexClassLoader to load the one or more dex class files included in the updated version of the application client and the one or more corresponding dex class files in the current version of the application client, including traversing, in sequence, the one or more dex class files in the application patch file package and inserting, into the application client, each of the one or more dex class files having a respective identical class name in front of each of existing dex class files of a corresponding application component in the current version of the application client having the respective identical class name; and initializing the application client by (i) invoking each of the one or more dex class files having the respective class name and corresponding to the updated version of the application client and (ii) bypassing invocation of the corresponding dex class files in the current version of the application client having the identical class name.

9. The computing device of claim 8, the operations further comprising:

in accordance with a determination that the application patch file package does not exist for the application client locally at the computing device, completing initialization of the application client without updating the current version of the application client;

after completing the initialization of the application client without updating the current version of the application client, connecting to the application server to request new version information for the application client; and in accordance with a determination that a new version of the application client exists at the application server based on the new version information obtained from the application server, downloading a latest patch file package for the application client from the application server, wherein the latest patch file package includes at least a first executable file generated from a first class file for which there is a difference between a latest version of the application client and the current version of the application client, and wherein the latest patch file package does not include at least a second executable file generated from a second class file for which the latest version of the application client and the current version of the application client do not have a difference.

10. The computing device of claim 9, the operations further comprising:

in accordance with a determination that the new version of the application client exists at the application server based on the new version information obtained from the application server, requesting configuration information regarding whether update requires a restart of the application client; and in accordance with a determination that the update does not require a restart of the application client, storing the latest patch file package at the computing device for updating the application client during initialization when the application client is started next time, without interrupting operation of the application client.

11. The computing device of claim 10, the operations further comprising:

in accordance with a determination that the update requires a restart of the application client, prompting for user confirmation regarding whether to update the application client.

12. The computing device of claim 8, the operations further comprising:

in accordance with a determination that the application patch file package exists for the application client at the computing device:

prior to invoking the DexClassLoader to load the one or more dex class files, performing security verification of the patch file package.

13. The computing device of claim 8, wherein the one or more dex class files in the updated version of the application client do not overwrite any files of the current version of the application client at the computing device.

14. The computing device of claim 8, the operations further comprising updating the one or more corresponding dex class files in the current version of the application client with the one or more dex class files in the updated version of the application client without deleting the one or more corresponding dex class files.

15. A non-transitory computer-readable storage medium storing a plurality of instructions configured for execution by a computing device having one or more processors, wherein the plurality of instructions cause the computing device to perform operations comprising:

detecting that an application client is started at the computing device, wherein the application client comprises a current version and includes one or more dex class files in the current version;

in response to detecting that the application client is started at the computing device, determining whether an application patch file package exists for the application client locally at the computing device, wherein:

the application patch file package is generated by an application server and downloaded to the computing device prior to the starting of the application client;

the application patch file package corresponds to an updated version of the application client; and the updated version of the application client includes one or more dex class files, each dex class file having an identical class name as a corresponding dex class file in the current version of the application client and having modified content from the corresponding dex class file;

in accordance with a determination that the application patch file package exists for the application client locally at the computing device:

invoking a DexClassLoader to load the one or more dex class files included in the updated version of the application client and the one or more corresponding dex class files in the current version of the application client, including traversing, in sequence, the one or more dex class files in the application patch file package and inserting, into the application client, each of the one or more dex class files having a respective identical class name in front of each of existing dex class files of a corresponding application component in the current version of the application client having the respective identical class name; and initializing the application client by (i) invoking each of the one or more dex class files having the respective class name and corresponding to the updated version of the application client and (ii) bypassing invocation of the corresponding dex class files in the current version of the application client having the identical class name.

16. The non-transitory computer-readable storage medium of claim 15, the operations further comprising:

in accordance with a determination that the application patch file package does not exist for the application client locally at the computing device, completing initialization of the application client without updating the current version of the application client;

after completing the initialization of the application client without updating the current version of the application client, connecting to the application server corresponding to the application client to request new version information for the application client; and in accordance with a determination that a new version of the application client exists at the application server based on the new version information obtained from the application server, downloading a latest patch file package for the application client from the application server, wherein the latest patch file package includes at least a first executable file generated from a first class file for which there is a difference between a latest version of the application client and the current version of the application client, and wherein the latest patch file package does not include at least a second executable file generated from a second class file for which the latest version of the application client and the current version of the application client do not have a difference.

17. The non-transitory computer-readable storage medium of claim 16, the operations further comprising:

in accordance with a determination that the new version of the application client exists at the application server based on the new version information obtained from the application server, requesting configuration information regarding whether update requires a restart of the application client; and in accordance with a determination that the update does not require a restart of the application client, storing the latest patch file package at the computing device for updating the application client during initialization when the application client is started next time, without interrupting operation of the application client.

18. The non-transitory computer-readable storage medium of claim 17, the operations further comprising:

in accordance with a determination that the update requires a restart of the application client, prompting for user confirmation regarding whether to update the application client.

19. The non-transitory computer-readable storage medium of claim 15, the operations further comprising:

in accordance with a determination that the application patch file package exists for the application client at the computing device:

prior to invoking the DexClassLoader to load the one or more dex class files, performing security verification of the patch file package.

20. The non-transitory computer-readable storage medium of claim 15, the operations further comprising updating the one or more corresponding dex class files in the current version of the application client with the one or more dex class files in the updated version of the application client without deleting the one or more corresponding dex class files.

* * * * *